United States Patent [19]
de Hita et al.

[11] Patent Number: 6,081,774
[45] Date of Patent: Jun. 27, 2000

[54] NATURAL LANGUAGE INFORMATION RETRIEVAL SYSTEM AND METHOD

[75] Inventors: Carolina Rubio de Hita; David van den Akker, both of Antwerpen; Erik C. E. Govaers, Malle; Frank M. J. Platteau, Borgerhout; Kurt Van Deun, Schoten, all of Belgium; Melissa Macpherson, Albuquerque, N. Mex.; Peter de Bie, Berchem; Sophie Laviolette, Brussels, both of Belgium

[73] Assignee: Novell, Inc., Provo, Utah

[21] Appl. No.: 08/916,628

[22] Filed: Aug. 22, 1997

[51] Int. Cl.[7] .............................. G06F 17/27; G06F 7/00
[52] U.S. Cl. ...................................... 704/9; 707/3
[58] Field of Search ............................ 704/1, 9, 10, 530, 704/531; 707/3, 10

[56] References Cited

U.S. PATENT DOCUMENTS

| | | | |
|---|---|---|---|
| 5,251,316 | 10/1993 | Anick et al. | 704/10 |
| 5,325,298 | 6/1994 | Gallant | 704/9 |
| 5,475,587 | 12/1995 | Anick et al. | 704/9 |
| 5,761,688 | 6/1998 | Morishita | 707/532 |
| 5,794,178 | 8/1998 | Caid et al. | 704/9 |
| 5,913,215 | 6/1999 | Rubinstein | 704/10 |

*Primary Examiner*—Forester W. Isen
*Assistant Examiner*—Patrick N. Edouard
*Attorney, Agent, or Firm*—Wolf, Greenfield & Sack, P.C.; James H. Morris; Alan B. Sherr

[57] ABSTRACT

An information retrieval system that represents the content of a language-based database being searched as well as the user's natural language query. In accordance with one aspect of the invention, the information retrieval system includes a non-real-time development system for automatically creating a database index having one or more content-based database keywords of the data base; and a real-time retrieval system that, in response to a user's natural language query, searches the keyword index for one or more content-based query keywords derived from the natural language query. The development system and the retrieval system morphologically, syntactically and linguistically analyze the data base and the natural language query, respectively, to generate the one or more database keywords and query keywords representing the content of the database and the natural language query, respectively. The development system includes a software development system for creating the database index utilizing a pattern dictionary that includes synonyms and skip words and a morphosyntactic dictionary that includes morphological and syntactic information for words in the natural language of the language-based database and the natural language query. In one embodiment, the retrieval system includes a natural language interface system for creating the one or more query keywords utilizing the pattern dictionary and the morphosyntactic dictionary. In one embodiment, the retrieval system also includes a query-index matcher for matching the one or more query keywords with the one or more database keywords.

16 Claims, 19 Drawing Sheets

FIG. 7

HELP FILE 700

```
1   <HTML>
2   <HEAD><TITLE>To change the font appearance</TITLE></HEAD>
3   <meta NAME="Keywords"CONTENT="font,font appearance">
4   <H1>To change the font appearance</H1>
5   <ol>
6       <li>To use bold, italic, or underline, click <B>b</B>,<I>i</I> or <U>u</U> on the
7   Toolbar.
8       <li>To use double underline, outline, shadow, small cap, redline, or strikeout, click
9   Format Font, then select an option in the Appearance group box.
10      <li>Type the text.
11      <li>To turn off an appearance attribute, click the Toolbar button again, or deselect the
12  option in the Font dialogue box.
13  </ol>
14  <b>Tips</b>
15  <ul>
16  <LI>You can select the text first and then click the Toolbar button or the option in the Font
17  dialogue box.
18  <LI>To turn bold, italic, or underline on or off, you can also press Ctrl+B, Ctrl+I, or Ctrl+U.
19  <LI>To create hidden text, select the text first, then click Hidden in the Font dialogue box.
20  <LI>You can add buttons to the the Toolbar for any of the font attributes and for the Font dialogue
21  box.
22  </ul>
23  <h5>Please, send your suggestions to carolina@novell.com</h5>
24  </BODY>
25  </HTML>
```

FIG. 16

```
                                                                    DATABASE
                                                                    INDEX 530
┌─────────────────────────────────────────────────────────────────────┐
│                            530-1A                                    │
1  │ font.hlp | To change the font appearance                          │
2  │ 10: Font                                                          │
3  │ 7: Font appearance                                                │
4  │ 5: Font dialog box                                                │
5  │ 2: Toolbar                                                        │
6  │ ::                                        530-1B                  │── 530-1
7  │ WW_MODIFY# font appearance#                                       │
8  │ bold# font bold# italic# font italic#$ underline# font underline# font underline#$ toolbar#
9  │ double underline# outline# shadow# small cap# redline# strikeout# format font#
10 │ appearace group box#                                              │
11 │ text#                                                             │
12 │ turn_off# stop$ deactivate#$ appearance attribute# font dialog box#│
13 │ tip#                                                              │
14 │ font dialog box#                                                  │
15 │ turn_on# bold# font bold#$ italic# font italic#$ underline# font underline#$
16 │ create# hidden text# hidden# font dialog box#                     │
17 │ add# button# toolbar# font attribute# font dialog box#            │
18 │ font#                                                             │
19 │ ::                                         530-2A                 │
20 │ footer.hlp| To insert or edit a footer                            │
21 │ [keywords]                                 530-2B                 │── 530-2
22 │ ::                                                                │
23 │ [linguistic text]                                                 │
24 │ ::                                                                │
25 │ ...[ASCII Natural Language Index for other help files]            │── 530-x
└─────────────────────────────────────────────────────────────────────┘
```

NATURAL LANGUAGE INFORMATION RETRIEVAL SYSTEM AND METHOD

BACKGROUND OF THE INVENTION

1. Field of the Invention

The present invention relates generally to information retrieval systems and, more particularly, to natural language information retrieval systems.

2. Related Art

As information systems become increasingly interconnected through intranets and internets, the main problem with the search for information has shifted from determining whether the requisite information exists to determining how to locate such information.

To explore the Internet or some other large database, well-known browsers and search engines are available. Unfortunately, currently existing search engines generally require the use of expressions and search methods with which the user has to be familiar, and generally require the user to enter keywords assumed to be related to the information that the user seeks. Moreover, a typical search returns a vast amount of information, much of it being irrelevant to the user. The user is then required to find the few relevant documents from the search results. Furthermore, it is not uncommon to not locate interesting documents because the user did not use keywords that corresponded to the words or word forms as written in those documents. Various conventional techniques have been developed to improve the recall of these and other information retrieval systems. However, these techniques have many drawbacks that limit their effectiveness in improving the ability of information retrieval systems to identify all available information related to a desired search topic.

A primary drawback is that the conventional method for expressing the content of a text is a single word extraction. Conventional information retrieval methods rely on word stemming or rooting, skip word filtering, and proximity measures. Typically, conventional systems stem or root the words that occur in the text and subsequently filter out all stems or roots that appear in a predetermined skip list. The skip list contains words that have little or no predictive value. Such words include function words, such as articles, pronouns, prepositions and other frequently used words. The end result of these conventional methods is a keyword list containing a list of single non-trivial words occurring in the document, optionally ordered by their frequency in the text. The keywords in the keyword list are in their stemmed or rooted form, and accompanied by their offset values or similar location markers.

For computer applications that require an intelligent representation of the content of a text, these conventional methods are inadequate. For example, meaningful units of content generally consist of more than one single word as provided by the conventional information retrieval systems. For example, in a keyword list containing, among others, "Amsterdam", "Rotterdam", "Marathon", and "Airport", the informational content of the text, the Rotterdam Marathon and Amsterdam Airport, is lost. Likewise, in a query "are the Antwerp Yellow Pages in the Web yet?", the crucial phrase evidently is "Antwerp Yellow Pages". This phrase needs to be parsed and processed in a way that retains the informational content of the query. Specifically, only those documents that literally match on "Yellow Pages" and not just any occurrence of either "page" and "yellow" separately, as well as on "Antwerp" in a premodifying or postmodifying position, rather than just in any location in the text, should be retrieved from the searched database. However, conventional information retrieval systems typically yield the query "Antwerp or Yellow or Page" which may retrieve, among others, documents on Flemisch paper factories. Furthermore, the single keywords "yellow" and "page" fail to express the notion that emerges from their combination and preservation of the plural form; that is, "Yellow Pages".

In addition, the single keyword lists used in conventional information retrieval systems do not merge expressions that are different in form but share the same reference. A method that ignores synonyms, hyponymys, name variants, frequent misspellings, and other semantic relations, fails to give a proper representation of the document's content. For example, a text dealing with the wife of the current president of the United States may contain any number of references to that person, ranging from "the President's wife" and "The First Lady" to "Mrs. Clinton" and "Hilary." Conventional information retrieval systems ignore these synonymous expressions, failing to give a proper representation of a text's contents.

Another drawback to conventional systems is that their mechanical application of a skip word list ignores the content representation of the text. For example, the individual word "page" may be a skip word, but in combinations like "Yellow Pages" or even "The Sports Pages," it should be preserved. Likewise, skipping "first" from "First Lady" leads to a loss of the essence of the expression.

What is needed, therefore, is an apparatus and method for efficiently retrieving information that accurately represents the content of both the text being searched, and the user's query, in such a way that the two can be more effectively matched.

SUMMARY OF THE INVENTION

The present invention is an information retrieval system that represents the content of a language-based database being searched as well as a user's natural language query. In accordance with one aspect of the invention, the information retrieval system includes a non-real-time development system for automatically creating a database index having one or more content-based database keywords of the language-based database; and a real-time retrieval system that, in response to a user's natural language query, searches the database index for one or more content-based query keywords derived from the natural language query. The development system and the retrieval system morphologically and syntactically analyze the language-based database and the natural language query, respectively, to generate the one or more database keywords and query keywords representing the content of the language-based database and the natural language query, respectively. Advantageously, the present invention utilizes generally the same morphological and syntactic analysis on both the language-based database and the query to generate the content-based keywords in generally the same manner from both, increasing the likelihood of the query locating all relevant text in the searched language-based database. Additionally, the non-real-time development system generates the database index automatically, significantly reducing the need to manually characterize the content of the language-based database so that it may be searched. Furthermore, the ability of the non-real-time development system to automatically create the database index enables the non-real-time development system to be configured as a Software Developer's Kit (SDK). The information retrieval system of the present invention may be configured for any natural language.

In one embodiment, the development system includes a software development system for creating the database index utilizing a pattern dictionary that contains context-dependent lexical information related to the relevenace of words and expressions (skip words and expressions, important words and expressions, degree of generality or specificity, etc.) as well as semantic relationships (synonyms, hyponyms, hypernyms and semantic clusters). The development system also includes a morphosyntactic dictionary that includes morphological and syntactic information. These dictionaries are compiled a priori to encompass the natural language in which the language-based database and natural language queries will be used. In this embodiment, the retrieval system includes a natural language interface system for creating the one or more query keywords utilizing the pattern dictionary and the morphosyntactic dictionary. In this embodiment, the retrieval system also includes a query-index matcher for matching the one or more query keywords with the one or more database keywords.

In one embodiment, the information retrieval system includes a software development system, preferably configured as a software developer's kit (SDK), that creates the content-based database index utilizing a pattern dictionary that includes synonyms and skip words and a morphosyntactic dictionary including morphological and syntactic information for words in the natural language. Preferably, the dictionaries are customized to more accurately reflect the linguistic content of the language-based database. The information retrieval system also includes a natural language interface system that creates content-based query keywords from the natural language query, and a query-index matcher for matching these query keywords with the database keywords of the database index.

In one embodiment, the software development system includes an index builder that generates the database index and, preferably, an expression list editor that enables the software developer to modify the pattern dictionary to generate a merged pattern dictionary.

In one embodiment, the index builder includes a keyword builder that identifies the most appropriate topics to identify the contents of the language-based database, which may include one or more database text files. The keyword builder identifies, for each sentence unit in each database text file, head words, which are words that are modified, and modifier words, which are words that modify head words. The index builder also includes a linguistic image builder that builds a separate topic tree for each sentence in each database text file in the language-based database and inserts each head topic with its modifier topics in the database index.

The query builder and the keyword builder preferably include a linguistic array generator that sequentially processes each sentence unit in the database text files to generate a temporary linguistic array that contains selected tokens and relevant morphosyntactic and linguistic attributes of the tokens; a topic tree builder that builds a linked data structure containing topic records of the roots of tokens recording the token attributes, occurrence records recording the position and original form of each token, and synonym records containing synonyms, if any, of the tokens in the topic records. The keyword builder preferably also includes a topic prioritizer that prioritizes the normalized topics in the topic tree in accordance with the frequency of their occurrence and other indicators of their importance inferred from their token attributes; and a keyword processor that selects the most important topics based on their assigned priority, normalizes their weights in relation to any topics manually provided by the software developer, and inserts them into the database index.

In another embodiment, the linguistic array generator includes a token attribute generator that identifies and characterizes tokens and sentences in the database text file and populates the array with the identified attributes, a syntactic tagger that supplements the array with morphological and syntactic data to identify the relative importance of each token in the array, and a parse filter that filters tokens from the array that are not likely to assist in matching topics of a natural language query to topics of the database text file.

The token attribute generator includes a token identifier that identifies tokens in the database text file, a sentence unit identifier that demarcates the sentences in the database text file and a format identifier that converts the database text file into a format that can be understood by the system. The token attribute generator also includes a position identifier that identifies the position of the token in the database text file, a layout identifier that identifies the location of the sentence in the database text file, a morphosyntactic identifier that populates the array with all morphosyntactic information from the morphosyntactic dictionary for each token, and a special token identifier that identifies tokens related to particular categories of information.

The syntactic tagger includes a morphological identifier that identifies the correct morphological form of the token, a syntactic unit identifier that identifies groups of tokens in syntactic units and identifies the dependencies among the tokens within each syntactic unit, a grammatical identifier that identifies the grammatical function of the tokens, and a synonym identifier that identifies a label representing a group of synonyms for each token, if such a group exists in the merged pattern dictionary.

The parse filter includes a syntactic filter that syntactically filters tokens from the array that are not likely to assist in matching topics of a natural language query to topics of a database text file, and a lexical filter that eliminates tokens associated with predetermined words that are not likely to assist in matching topics of a natural language query to topics of a database text file.

The topic prioritizer includes a token weight calculator that prioritizes the topics in the topic tree in accordance with the frequency of their occurrence and other indicators of their importance inferred from their token attributes, and a topic normalizer that determines the most appropriate morphosyntactic and typographical form for the topic based not just on identification of its root but of the form, root or inflected, that occurred most frequently for that topic.

An advantage of one embodiment of the present invention is that it enables any software developer to add the information retrieval system to a pre-existing software application to provide a user interface that enables the user to develop a query in a natural language. Another advantage is that the SDK of the present invention enables software developers to add the natural language interface and associated information retrieval capability to an existing software application without having to perform any development work.

Further features and advantages of the present invention as well as the structure and operation of various embodiments of the present invention are described in detail below with reference to the accompanying drawings. In the drawings, like reference numerals indicate like or functionally similar elements.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIG. 7 is an illustration of an exemplary help file;

FIG. 16 is an exemplary database index shown in FIG. 5;

DETAILED DESCRIPTION

The present invention is an information retrieval system for retrieving information from a language-based database in response to natural language queries. The present invention will be described below with reference to a preferred implementation wherein the language-based database is an English language help database containing help text files that provide a user with information to assist in the operation of an associated software program on a computer platform. As will be explained in detail below, implementation of the information retrieval system of the present invention provides the user with a natural language interface. With this interface, the user can search the database by providing the information retrieval system with a natural language query.

The terms "language-based database" or "database text files" are used herein to generally refer to information expressed in a natural language; that is, a language typically used by people in normal discourse, such as the English, Dutch, or Spanish languages. As is well-known in the art, words or phrases contained in a language-based database may have special technical meanings. In other implementations, the language-based database may include words or phrases directed towards specific technical or other purposes. Thus, the language-based database may contain words or phrases that are not commonly in usage in any natural language but nonetheless are used in general conformance with such a language. The term "natural language query" generally refers to one or more search requests expressed in the form of an ordinary natural language question or statement. The natural-language query may be provided to the information retrieval system in any well-known manner described below.

Figure 1:
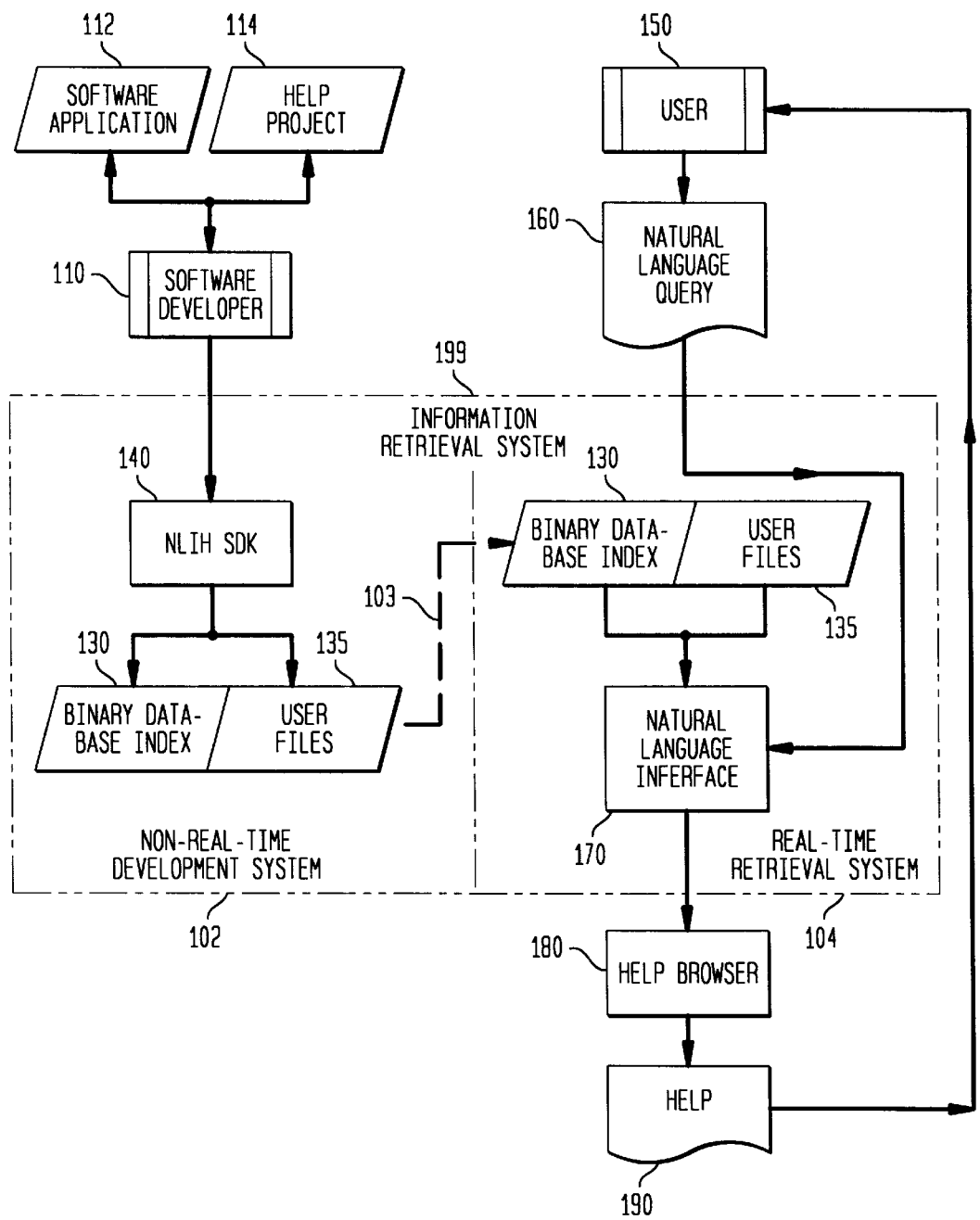
FIG. 1 is a functional block diagram of one embodiment of the information retrieval system of the present invention.
Figure 2:
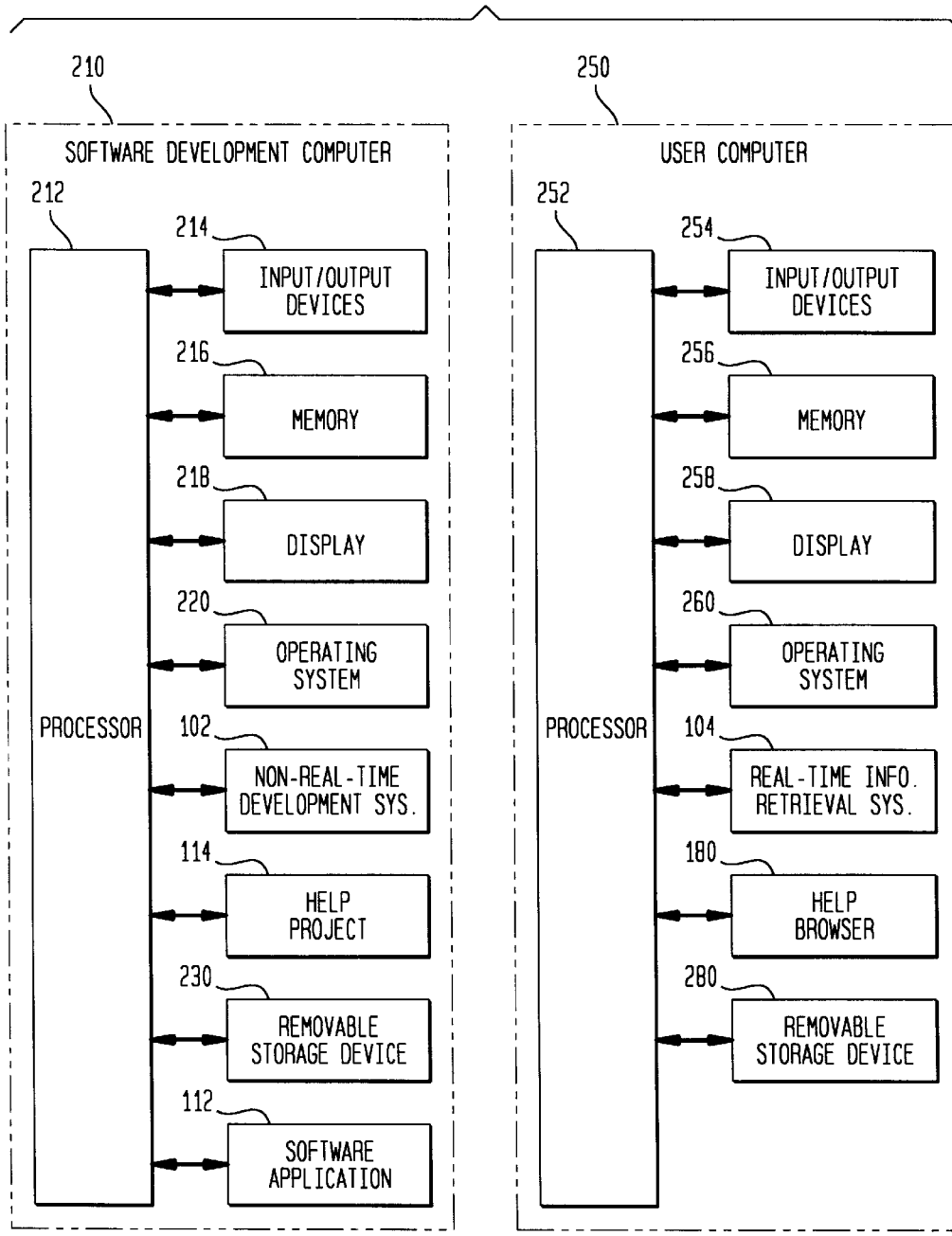
FIG. 2 is an architectural block diagram of one embodiment of a software development computer and a user computer in which a preferred embodiment of the information retrieval system of the present invention is implemented.

FIG. 1 is a functional block diagram of one preferred embodiment of the information retrieval system 199 implemented in an exemplary English language software application help database. FIG. 2 is an architectural block diagram of the information retrieval system shown in FIG. 1 implemented in a software development and a user computer. The information retrieval system includes a non-real-time development subsystem 102 used by a software developer 110 to perform linguistic text processing of the language-based database help project 114 to create a binary database index 130 in accordance with the present invention. The information retrieval system 199 of the present invention also includes a real-time retrieval system 104 for enabling a user 150 of a software application 112 to access a help project 114 using natural language queries. The retrieval system 104 includes a natural language interface 170 for processing the natural language queries and accessing the database index created by the development system 102.

Preferably, the development system 102 is implemented in software and, more preferably, is configured as a software developer's kit (SDK). As is well-known, an SDK is a software package that provides an application program interface (API) which may be customized to integrate the information retrieval system 199 with any desired language-based database and software application. In the illustrative implementation wherein the language-based database is the help project 114, the development subsystem 140 is referred to herein as the natural language interface for help software developer's kit (NLIH SDK).

As shown in FIG. 1, software developer 110 may develop a software application 112, such as a word processor, spread sheet, utility program or any other software program for use on a computer platform, such as user computer 250 shown in FIG. 2. Software developer 110 may also develop help project 114 to assist the user of software application 112. It should be understood that the term "software developer" may refer to any database author, programmer or any other person or machine who, or which, develops help project 114. For purposes of the present invention, it is immaterial, however, whether software developer 110 or any other person or entity developed the help project 114 or the software application 112. The term "help project" will be understood to refer to a collection of instructions, tips, guides, outlines or any other text-related information which is presented in a natural language and provided to assist a user. The help project 114 may contain as little or as much information as desired, and such information may be contained in as few or as many files, records, or other units of organization as may be convenient.

An example of a help project 114 that may be developed by a software developer 110 is a Windows Help system created using the Microsoft Help Workshop from the Microsoft Corporation. It will be understood, however, that the information retrieval system 199 of the present invention may be used with a variety of software applications for developing help information or with a variety of word processors, text editors, or other programs that are capable of producing a natural-language database of, for instance, help information. Some types of such programs, including the Microsoft Help Workshop, may be used to present information in rich text format (RTF). A word processor, text editor, HTML-editor, or similar program may be used to create data files in the Hyper-Text Markup Language (HTML) format generally used for transmission using the "Hyper-Text Transfer Protocol" (HTTP) over the interconnection of computers commonly referred to as the Internet. Such data files may be displayed by a type of software application commonly referred to as a "web browser" such as Netscape of the Netscape Corporation or Internet Explorer of the Microsoft Corporation. Such browsers may display such data files, not only for uses of the Internet, but also for any user wishing to view a file in HTML format irrespective of how such a file was transmitted or obtained. For illustrative purposes only, the information retrieval system 199 of the present invention will hereafter be described in reference to the help project 114 configured in the HTML format, although it will be understood that the help file may be in any format readable by computer system 110.

NLIH SDK 140 linguistically and syntactically analyses help project 114 to produce a binary database index 130 and associated user files 135. User files 135 primarily include the language-based database shown in the illustrative embodiment as help project 114. In those implementations wherein the software developer 110 is also creating an associated software application, such as software application 112 shown in FIG. 1, then the user files 135 preferably also include the software application 112 as well. Accordingly, the NLIH SDK 140 creates a deliverable product which includes the index created in accordance with the present invention and the language-based database associated with it, as well as the software application, if any, with which the index and database operate.

NLIH SDK 140 may also be used to edit software application 112 to provide greater interaction between the software application 112 and natural language interface 170 in any known manner using an appropriate API, as will be evident to those skilled in the art.

Preferably, the index created by the present invention is a binary file, referred to in the illustrative example as a binary database index 130. As is well-known in the art, a binary file is a computer-readable file that is structured and formatted so that it is ready to be executed, or used in execution, in a computer system such as user computer 250. Typically, but not necessarily, database index 130 and associated user files 135 will be delivered to a user 150 as indicated by dashed arrow 145. As noted, user files 135 will include the help project 114 and the software application 112, which may have been edited as described above, as well as natural language interface 170. It will be understood, that the word "delivered" is used herein to refer to any kind of transfer of the indicated software. Such delivery may be effectuated by physical shipment of one or more diskettes or other removable medium for storing software, by transmission over a network, or in any other well-known manner.

User 150 may load binary database index 130 and associated user files 135, and typically, but not necessarily, software application 112, onto a computer such as user computer 250. The user 150 may then present a search request in the form of natural language query 160. Typically, the user 150 generates a question by typing the query on an input device 254. The input device may be, for example, a keyboard or a speech recognition system for converting speech to the functional equivalent of a typewritten word. It will be understood that there are many other ways in which a natural language query 160 may be presented to the information retrieval system of the present invention, including reading a string of text or files containing questions stored in computer memory or transmitted over a network; or receiving a signal through an electromagnetic or other medium. It should also be understood that the user 150 posing such a question may be a person or machine.

The natural language interface 170 linguistically processes the natural language query 160 and searches the database index created by the development system 102 in accordance with the present invention for terms which are contained in the query. The output of the language interface 170 is provided to a well-known help browser 180. In the case of HTML-formatted files, the help browser 180 may be a web browser such as Netscape. The help browser 180 searches the help project 114 and generates help display 190 that is presented to the user 150 so that the user may review a help topic retrieved in response to a natural language query 160.

The implementation of the present invention is described below with reference to the exemplary computer system environment shown in FIG. 2. The non-real time development system 102 resides in the software development computer 210 to provide a development environment wherein a currently created or previously existing language-based database 114 is linguistically processed to generate a database index in accordance with the present invention. The real-time retrieval system 104 resides on a computer platform 250 with the help browser 180. The retrieval system 104 processes the natural language query generated by the user and searches the binary database index 130 installed on user computer 250.

Either or both of the software development computer system 210 or the user computer system 250 may be a general purpose computer system and may operate on a client and/or server node on a network or as a stand-alone computer system, such as a personal computer, a workstation or other computer platform. In alternative embodiments, the present invention may be implemented in a device specifically designed and configured to perform the functions of the present invention. Furthermore, in alternative embodiments, the computer systems 210 and 250 may be the same computer system. Typically, however, a user will not be the same entity as the software developer and computers 210 and 250 will be different computer systems not necessarily located in proximity to each other and not necessarily tied together in any communications network.

Computer 210 or 250 typically includes a processor 212 or 252, respectively, connected to a memory system, 216 or 256, respectively, via an interconnection means such as bus (not shown), through which communication or control may also be established with respect to other devices of the computer system. Input/output devices 214 or 254, such as disk controllers, graphics cards, or the like, may be included in computers 210 or 250, respectively. Input/output devices 214 or 254 may include a keyboard and/or a pointing device which may, for example, be a joystick, trackball or mouse that allows a software developer to interact with computer 210 and a user to interact with computer 250. As previously noted, such input/output devices may also include speech recognition or speech synthesis devices. One possible type of either an output or input device, a display device, is shown separately. Display 218 or 258 may be a CRT screen, or similar device, that allows the software developer or the user to visualize various operations and interactions with computer 210 or 250, respectively. As an input device, such a display may include a touch-screen CRT. Removable storage device 230 or 280 may be, for example, a CD-ROM drive, a tape drive, a removable hard disk drive, or a diskette drive. Such a removable storage device may be used, for example, by user 150 to load software application 112, binary database index 130, and user files 135 into computer system 250. Computers 210 and 250 each host an operating system 220 and 260, respectively, and are programmable using, for example, a high level computer programming language. Processors 212 and 252 may be a commercially available processor such as the Pentium microprocessor from Intel Corporation, PowerPC microprocessor, SPARC processor, PA-RISC processor or 68000 series microprocessor, or may be one of many other processors that are or will become available. Such a processor typically executes operating system 220 or 260, which may be, for example, the DOS, Windows 3.1, Windows for Work Groups, Windows 95, or Windows NT operating system from the Microsoft Corporation, the System 7 operating system from Apple Computer, the Solaris operating system from Sun Microsystems, the Unix operating system available from many vendors such as Sun Microsystems, Inc., Hewlett-Packard, or AT&T, or the NetWare operating system available from Novell, Inc., or some combination thereof, or a future operating system. Operating system 220 or 260 interfaces with firmware and hardware in a well-known manner. Memory system 216 or 256 may be any commonly available random access memory (RAM) or read-only memory (ROM), other magnetic medium such as a resident hard drive, or other memory storage device.

Operating system 220 or 260 controls the execution of other computer software programs, such as NLIH SDK 140 with respect to computer 210, or natural language interface 170 and help browser 180 with respect to computer 250. Operating system 220 or 260 also provides or supervises such functions as scheduling, debugging, input-output control, compilation, storage assignment, data management, memory management, communication control, and other services. Processor 212 or 252 and operating system 220 or 260, respectively, define computer platforms for which application programs in high level programming languages are written. Computer system 210 or 250 may be networked to other computer systems via a local or wide area network, using, for example, a network interface card or other communication device represented by 214 or 254, respectively, installed to communicate over a network. Network management software, maintained for example in memory 216 or 256, respectively, may be included as is well known in the art.

The information retrieval system 199 of the present invention may be implemented in the C++ or C programming languages, although any other programming language, including, for example, the Java or Visual BASIC programming languages, may be used. Software embodiments of the present invention, such as the development system 102 and the retrieval system 104 may be loaded onto their respective computers using an appropriate peripheral device such as a removal storage device 230 or 280, respectively, as is known in the art. Once loaded, they may typically reside in whole or in part in memory 216 or 256, respectively.

It will be understood that the term "software embodiment" refers to techniques, instructions, data, or other information for performing the techniques of the present invention. Such software embodiments may be contained on a computer-readable medium such as a magnetic disk, compact disk, magnetic tape, or other medium suitable for use with removable storage devices 230 and 280. Also, such software embodiments may be transmitted over a network and loaded through the aforementioned network interface card or other communication device. It will be understood that the present invention is not limited to a particular computer platform, operating system, processor, or storage device, or medium. The exemplary embodiments and devices identified above are given by way of example only; the invention may be implemented in a variety of computer systems having a variety of system architectures. In addition, it should be noted that the present invention may be implemented in firmware, hardware, or in any combination of these implementations.

Figure 3:
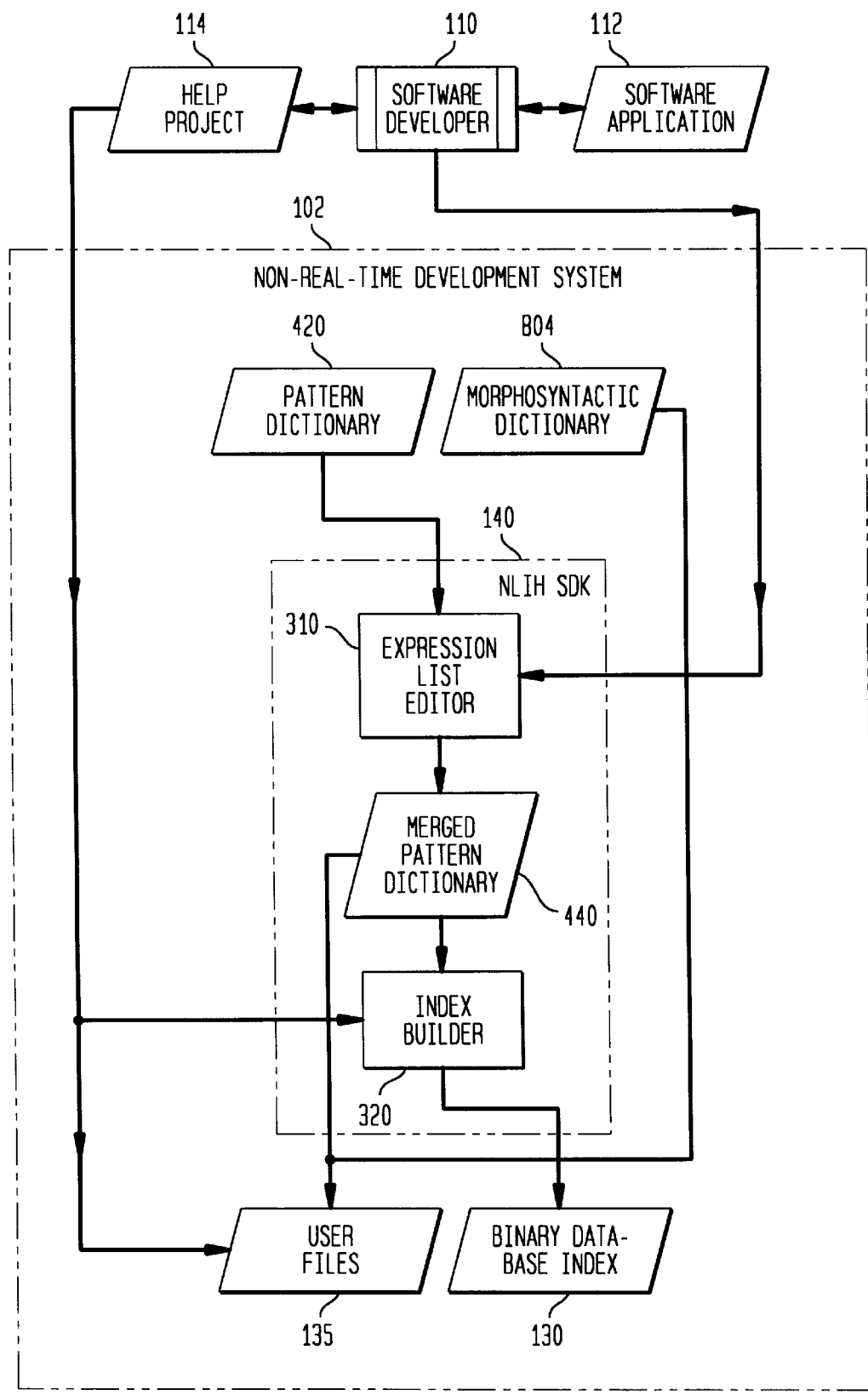
FIG. 3 is a functional block diagram of one embodiment of the non-real-time development system shown in FIG. 1.

FIG. 3 is a functional block diagram of one embodiment of the non-real-time development system 102 of the information retrieval system of the present invention. The development system 102 is invoked by the software developer 110 to automatically process the text files contained in the help project 114 to create the binary database index 130.

The NLIH SDK 140 includes an index builder 320 and an expression list editor 310. The index builder 320 linguistically and syntactically processes help project text files to generate the binary database index 130 in accordance with the present invention. The database index 130 contains, for each file in the help project 114, two categories of information. The first category of information includes a prioritized topic list of all topics in each of the files in the help project 114. The second category of information is a linguistic image of each sentence in the help project 114. The linguistic image is a representation of each sentence that uses syntactic criteria to identify the most important information in that sentence.

As will be explained below, natural language interface 170 carries out a number of operations in the same or similar manner that such operations are performed in the course of creating the binary database index 130. Thus, in the following description of the creation of the binary database index 130, it may be convenient and illustrative at times to explain an operation in terms of its relationship to both the help project 114 and to the natural language query 160, discussed further below. It will be understood, therefore, that such references to natural language query 160 do not pertain to the creation of the binary database index 130.

The non-real-time development system 102 includes a pattern dictionary 420 created a priori in accordance with the present invention. The pattern dictionary 420 includes predetermined synonyms and skip words in a predetermined format compatible with the NLIH SDK 140. The expression list editor 310 enables a software developer 110 to customize the pattern dictionary 420 by specifying additional or different synonyms and skip words to result in a merged pattern dictionary 440 which is better suited to the linguistic content of the help project 114 and/or the anticipated natural language query 160. As will be described in detail below, the merged pattern dictionary 440, as it may be so customized, is used by the index builder 320 in the linguistic analysis of the help project 114 and natural language query 160. The phrase "skip word" is used herein to refer to words or phrases that are so commonly used that they generally are not useful in linguistically analyzing the content of the documents or text files in which they appear. For example, the word "the" in the English language may not be useful in identifying the topic addressed by a help project or natural language query containing that word. However, the word "the" may be useful in morphosyntactically analyzing the sentence or sentence fragment in which it appears. The term "morphosyntactic" is derived from the word "morphology" which relates to the study of words and the rules by which they are formed, and the word "syntax" which relates to the pattern or structure of word order in a sentence or phrase.

Examples of synonyms that may be associated with each other in pattern dictionary 420 or merged pattern dictionary 440 are the nouns "bucket" and "pail," the verbs "watch" and "observe," and the adjectives "sad" and "unhappy," respectively. Thus, for example, if the word "bucket" is used in the help project 114 or natural language query 160, pattern dictionary 420 may be utilized, as described below, so that there is no functional difference between the use of one word or the other. If the user 150 poses a natural language query 160 containing the word "pail", the query may be associated with a portion of the help project 114 pertaining to the word "bucket."

The software developer 110 may wish to add synonyms that are not included in the pattern dictionary 420. For example, in the context of a computer-related help project 114, or an anticipated natural language query 160, the software developer 110 may wish to functionally equate the word "monitor" with the word "screen" used as nouns. Similarly, if the word "bucket" has a special meaning in the context of the software application 112, as reflected in the help project 114, software developer 110 may wish to detach the word "bucket" from its synonym "pail". Also, the software developer 110 may be aware of other information that constantly appears in a document and provides no assistance in determining the topic of the sentences and files within the help project 114 in which the word or phrase appears. In such a situation, the software developer 110 may wish to add such words or phrases to the skip words contained in the pattern dictionary 420.

The software developer 110 may be prompted or allowed to select additional synonyms or skip words, or otherwise edit or change the content of the pattern dictionary 420, by utilizing, for example, a graphical user interface accessible by the expression list editor 310 in a well-known manner. In the example illustrated in FIG. 3, the pattern dictionary 420 and the merged pattern dictionary 440 are constructed in the English language. It should be understood, however, that the phrase dictionaries 420 and 440 may operate with respect to any natural language. The non-real-time development system 102 also includes a morphosyntactic dictionary 804. The morphosyntactic dictionary 804 is created a priori in accordance with the present invention. The morphosyntactic dictionary 804 contains morphological and syntactical information for a plurality of selected words in the particular natural language. The morphological syntactic dictionary 804 is formatted in a predetermined manner for use by the index builder 320. The index builder 320 utilizes the morphological syntactic dictionary 352 to process the help project 114 to create the binary database index 130.

Figure 4:
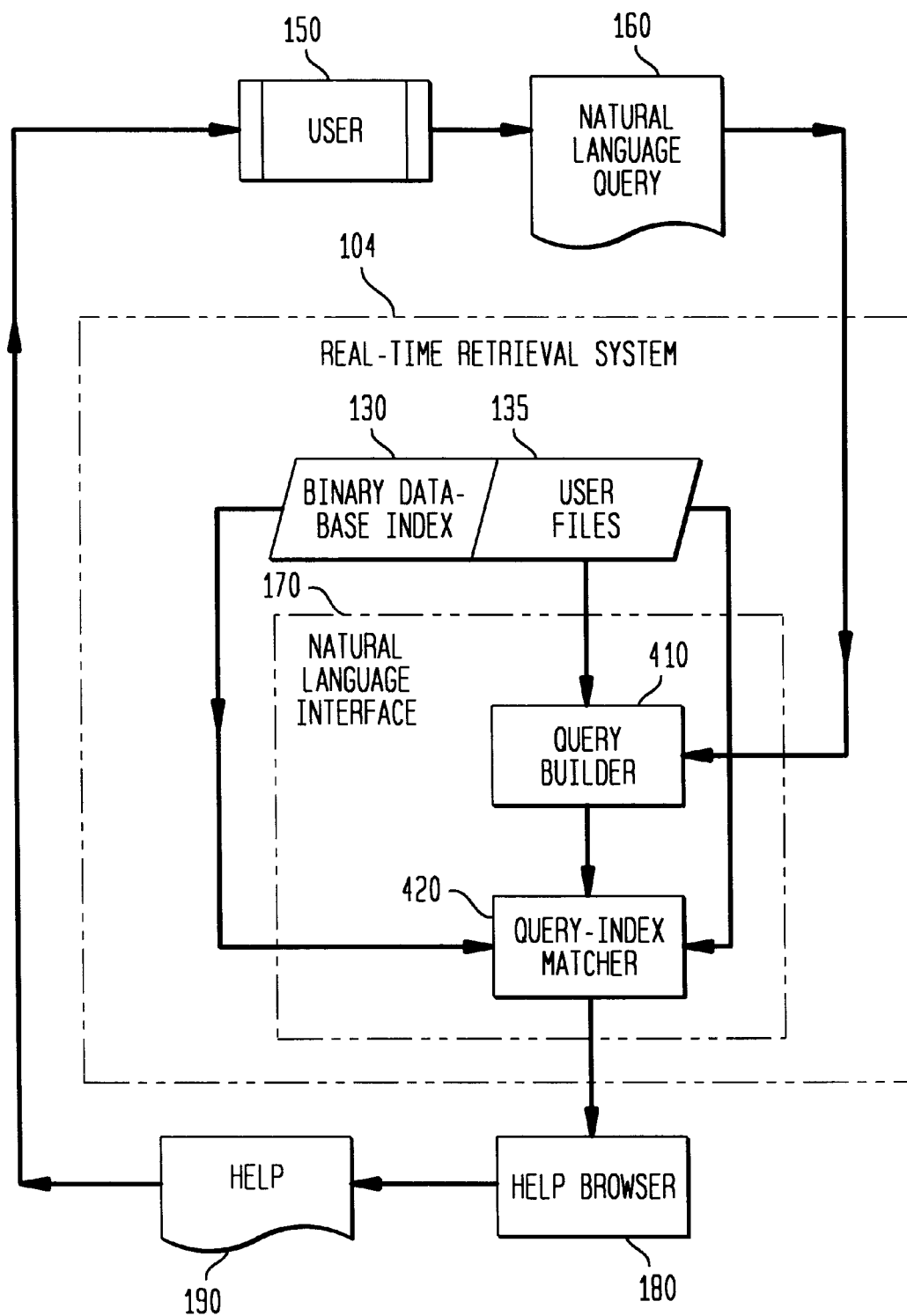
FIG. 4 is a functional block diagram of one embodiment of the real-time information retrieval system shown in FIG. 1.

FIG. 4 is a functional block diagram of one embodiment of the real-time retrieval system 104 of the present invention. As noted above, the retrieval system responds to a natural language query 160 from the user 150. Typically, user 150 is seeking help with respect to a topic related to software application 112, and wishes to obtain a list of help files, or portions of help files, most closely related to such topic. Natural language interface 170 makes use of user files 135 and binary database index 130 to provide such related topics based on a morphosyntactic analysis of the natural language query. Natural language interface 170 includes query builder 410 to provide such analysis of the natural language query, and query-index matcher 420 to match the query to the help information in user files 135 as indexed by binary database index 130. The most closely related help files, or portions of them, are then provided by the natural language interface 170 to a known help browser 180. The help browser provides such help files or portions of them as a help document or display 190 that may be read or otherwise understood by user 150.

Figure 5:
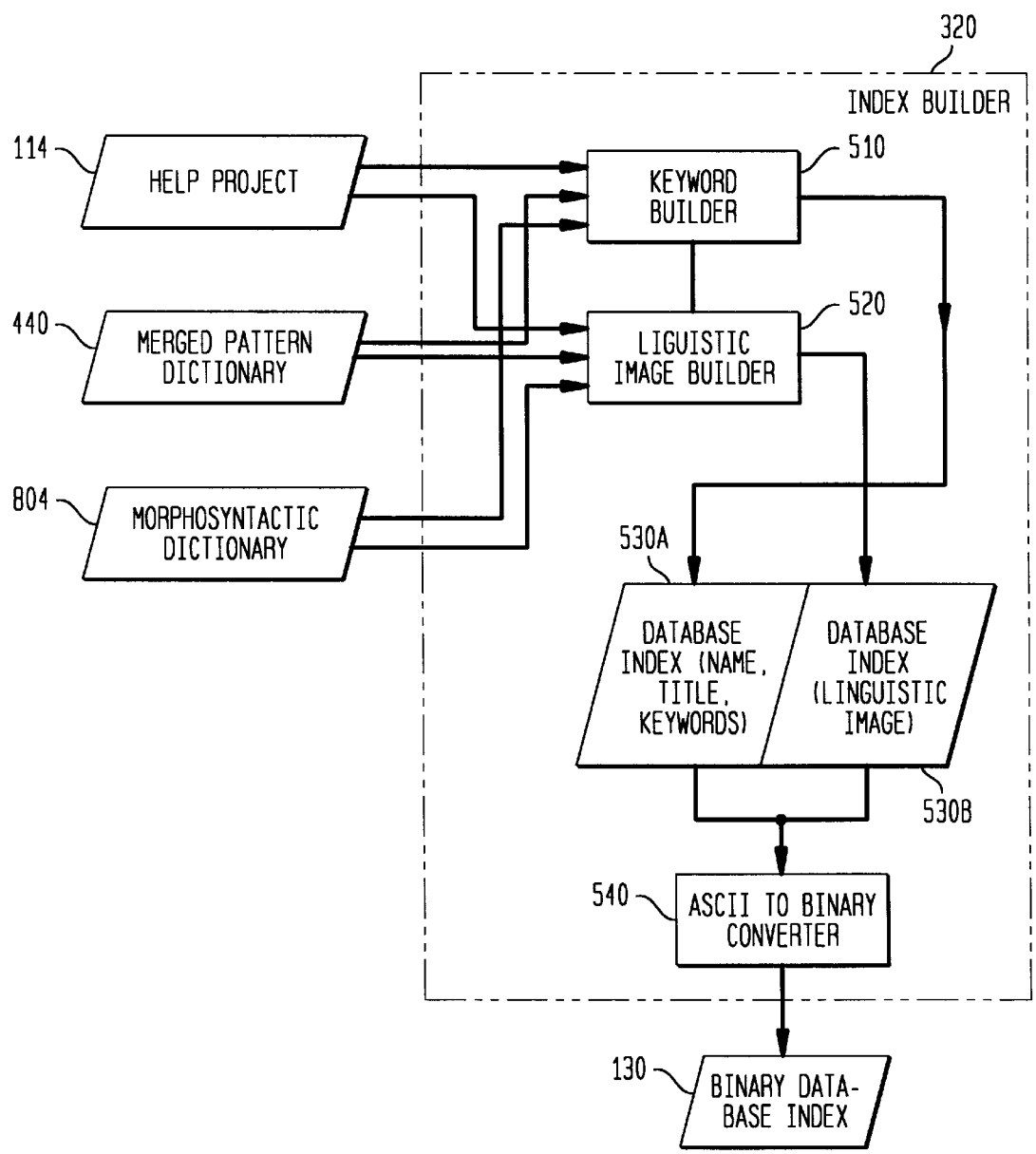
FIG. 5 is a functional block diagram of one embodiment of the index builder shown in FIG. 3.

FIG. 5 is a functional block diagram of one embodiment of the index builder 320 introduced above with reference to FIG. 3. The index builder 320 includes a keyword builder 510 and a linguistic image builder 520 that together create a database index 530. As one skilled in the relevant art would find apparent, database index 530 may be a representation of characters using the ASCII character set. Any convention for representing alphanumeric, symbolic, or other characters typically used in text documents may be employed, including, for example, Unicode or ANSI. As shown in FIG. 5, the database index 530 is comprised of a series of records, each record representing the content of a help file of help project 114. In each record, there are two portions. A first portion 530A provides the name of the help file, the title of the help item and the key terms of the help item and a second portion 530B provides a linguistic image of the sentences in the help file. Such records are repeated for all other help files in the help project 114 to create database index 530 that, as just noted, may be in the ASCII character set. An ASCII to binary converter 540 converts the ASCII database index 530 to the binary database index 130 described above.

When initiated, the index builder 320 performs operations sequentially on each of the help files in the help project 114 without intervention from the software developer 110. The keyword builder 510 creates a topic tree of selected words and phrases representing topics in each of the help files. Associated with each of these words or phrases is morphological, syntactical and semantic information related to the meaning of each of the words and phrases and its relationship with other words and phrases in the help file. The keyword builder 510 prioritizes the words and phrases, referred to herein as tokens, according to their importance in identifying the subject matter of the help file in which they occur. The keyword builder 510 inserts the most important tokens, along with the linguistic, morphological and syntactical information as keywords into the database index 530A, as noted above, for later comparison to content-based query keywords generated in the same manner from the natural language query 160.

The linguistic image builder 520 performs similar operations as the keyword builder 510 on each sentence in the help file. The linguistic image builder 520 stores a linguistic image of each sentence of each help file in the topic tree. The linguistic image includes morphosyntactic and linguistical information of selected words and phrases of each sentence. The output of the linguistic image builder 520 for the help file is shown in FIG. 5 as being stored in database index 530B, representing the appropriate portion of the record for that help file in database index 530, as noted above.

In one preferred embodiment the functions performed by the keyword builder 510 and linguistic image builder 520 are conducted in a single pass through each file in the help project 114 rather than the two-step, sequential processing illustrated in FIG. 5. That is, the functions of the keyword builder 510 and linguistic image builder 520 may be combined in part due to commonality of certain of their functions. As one skilled in the relevant art would find apparent, the decision of which of the preceding alternatives to employ in a particular embodiment of the invention is a question of preference based upon such factors as time and resource overhead involved in creating additional or temporary data structures to support single or multiple past approaches, and other factors known in the art.

As noted above, help project 114 may typically include text discussing various subject matter organized in single or separate help files. In the illustrative embodiment, the help project 114 includes multiple text files, or documents, although it will be understood that the information retrieval system 199 of the present invention does not depend on such organization. The operations of the keyword builder 510 and linguistic image builder 520 are preferably applied to each of the help files within the help project 114 sequentially, with the results cumulatively stored in the database index 530.

Figure 6:
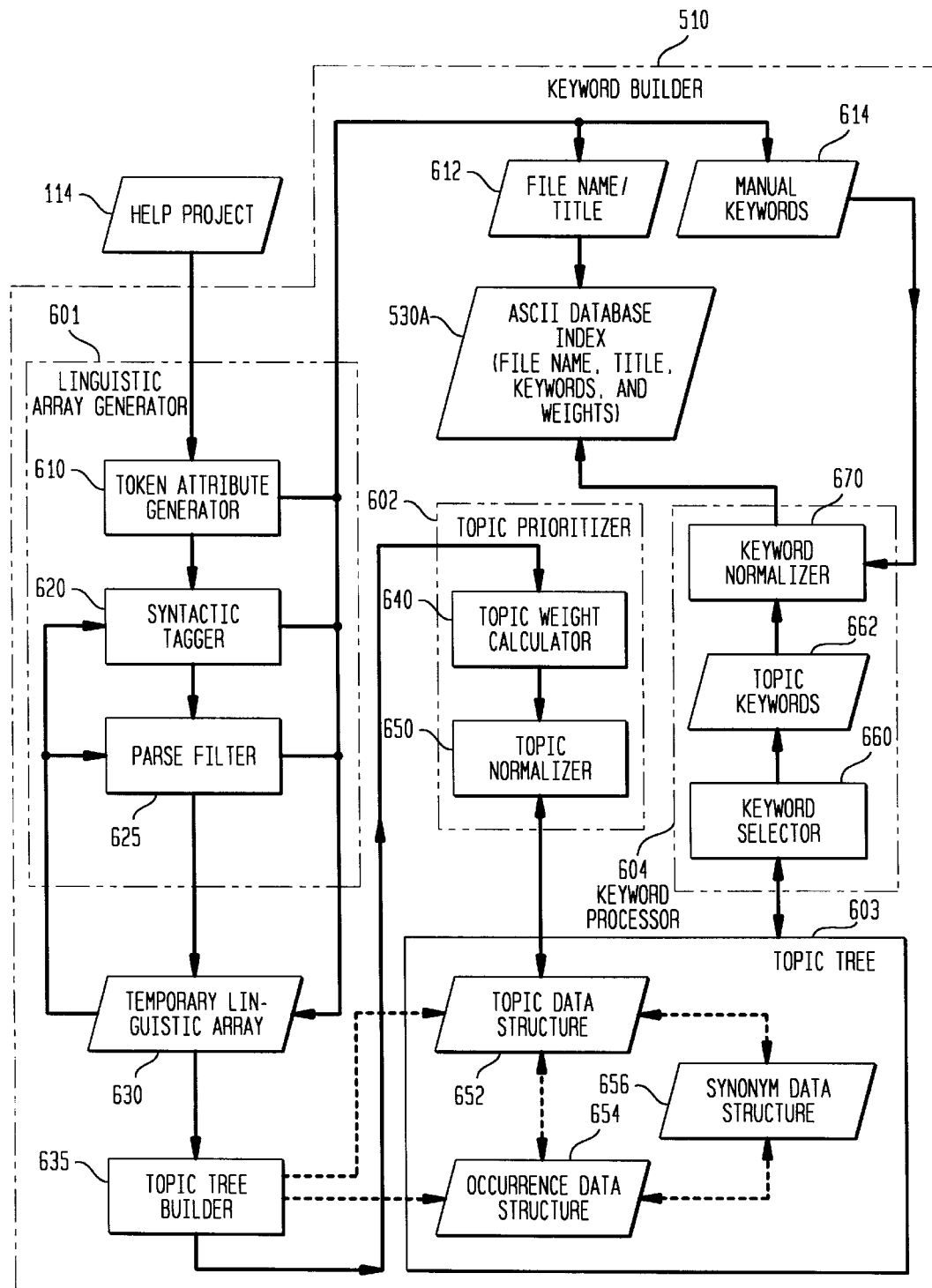
FIG. 6 is a functional block diagram of one embodiment of the keyword builder shown in FIG. 5.

FIG. 6 is a detailed block diagram illustrating the functions and processes of the keyword builder 510. In one preferred embodiment, the keyword builder 510 advantageously operates on each sentence of the help files sequentially. Specifically, the keyword builder 510 preferably operates on each "sentence unit" in each help file of the help project 114. As used herein, the term "sentence unit" refers generally to any grammatical unit in the natural language of the help project 114 or natural language query 160. Typically, but not necessarily, a "sentence unit" in the illustrative help project 114 is a sentence. That is, the sentence unit typically includes grammatical units having at least one subject and a finite verb or verb phrase. However, processing help files in accordance with a looser interpretation of sentence units is preferable because, for example, the help file may have a heading or similar text with or without initial capitalization of the first word. In addition, the help file may have phrases that conform neither to the usual rules of grammar or syntax applicable to a sentence.

The operations of the keyword builder 510 are described with reference to an illustrative help file 700 shown in FIG. 7 which may be one of a number of files in the help project 114 dealing with various topics related to word processing. Line numbers in the left margin of the help file 700 are added for reference only and do not constitute part of the illustrative help file. It should be noted that end-of-line characters, such as a "hard return," that define the ending of each line are not illustrated in FIG. 7. As previously noted, in the illustrative embodiment, the help project 114 is in the HTML format.

The keyword builder 510 includes a linguistic array generator 601 that processes each sentence unit in a help file to generate a temporary linguistic array 630 containing each token in the file along with the morphological, syntactical and semantic information related to that token. A topic tree builder 635 transfers the information from the temporary linguistic array 630 to three linked data structures forming a topic tree 603 and groups them according to the topic they represent. A topic data structure 652, occurrence data structure 654 and synonym data structure 656 form the topic tree 603. A topic prioritizer 602 assigns predetermined weights that can be altered by the user to each of the topics in the topic tree 603 and normalizes the topics to a predetermined (possibly user-specified) arbitrary norm. A keyword processor 604 retrieves selected topics from the topic tree 603 and inserts them into database index 530.

The arrows between the topic tree builder 635 and data structures of the topic tree 603 are shown as dotted lines in FIG. 6 to indicate that control does not pass through these lines. Rather, such data structure constitutes the output of the topic tree builder 635 as discussed in further detail below. In contrast, the arrows linking topic weight calculator 640 and topic normalizer 650 to these data structures are solid lines, indicating the transfer of control and data.

Figure 8:
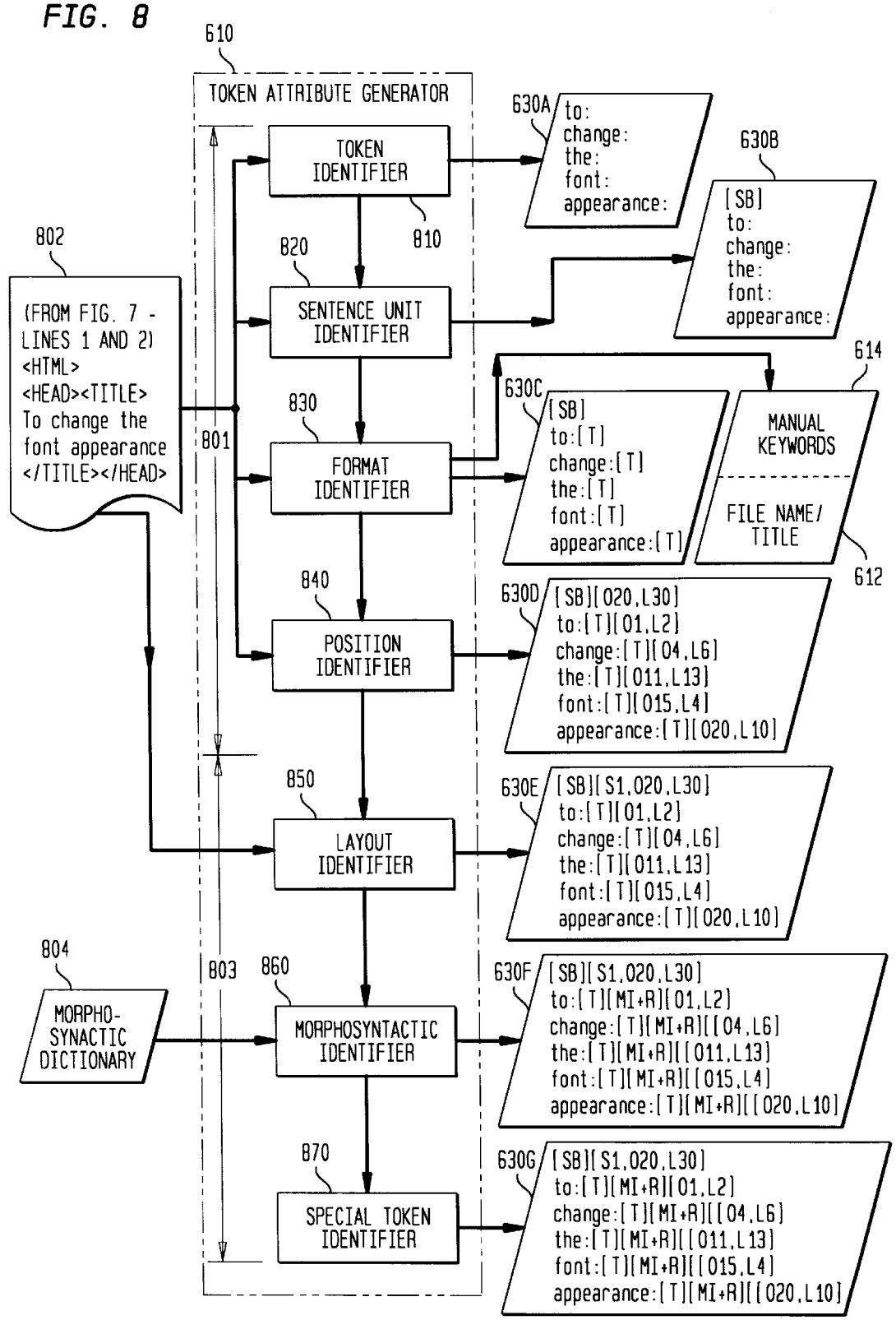
FIG. 8 is a functional block diagram of one embodiment of the token attribute generator shown in FIG. 6.

FIG. 8 is a functional block diagram of one embodiment of the token attribute generator 610. The token attribute generator 610 identifies and characterizes tokens and sentences in each help file and populates the temporary linguistic array 630 with identified token attributes. The term "token" as used herein refers to a fundamental morphosyntactic unit such as a word. Token attributes include the morphological, syntactical, semantic, and lexical characteristics of an associated token.

The token attribute generator 610 includes a token identifier 810 that identifies tokens in the help file currently being processed. The token identifier 810 may use any one of a variety of well-known techniques to identify linguistic tokens as they appear in the help file. For example, the first such token in the exemplary help file 700 is the "<HTML>", as shown in line 1 of the help file 700 and excerpted in block 802 of FIG. 8. Using well-known glossary look-up techniques, the token identifier 810 determines that this token has a particular meaning in the Hyper-Text Markup Language, and that the information carried by the token is not useful in the context of linguistic analysis. Accordingly, the token identifier 810 discards this token. As one skilled in the relevant art would find apparent, the content of the glossary which is used by the token identifier 810 may vary according to the underlying format of the help project 114 or natural language query 160. By the same resort to the HTML-format glossary (not shown), it may be determined that the characters "<TITLE>" and the "</TITLE>" in line 2 of the exemplary help file 700 ordinarily delineates a grouping of words that constitutes a sentence unit representing a title or header in a document. In particular, the characters "</TITLE>" may be understood to indicate the ending of a title and thus the ending of a grammatical unit that may be characterized as a sentence unit. The token identifier 810 copies each of the words in the delineated title into the temporary linguistic array 630 to create linguistic array 630A containing the tokens "to," "change," "the," "font," and "appearance." That is, the token identifier 810 inserts each non-discarded token in the temporary linguistic array 630 to create the temporary linguistic array 630A. The token identifier 810 then provides a sentence unit identifier 820 with information regarding the sentence boundary such as the above-noted characters which delineated the title.

The sentence unit identifier 820 demarcates the sentences in the help file currently being processed. The sentence unit identifier 820 inserts a sentence boundary [SB] marker in an appropriate position in the temporary linguistic array 630A to identify the balance of each sentence unit. Typically, each sentence unit is a sentence and the bounds are the beginning and the end of the sentence. The sentence unit identifier 820 employs any techniques now or later developed to find sentence boundaries. For example, the period found after the word "box" in line 9 of the exemplary help file 700, together with other indicators, such as the apparent non-applicability of other uses of the period for abbreviation or the like, may be taken as an indication of the ending of a sentence. As shown in FIG. 8, the sentence unit identifier 820 inserted the [SB] marker in the temporary linguistic array 630A to create temporary linguistic array 630B.

The token attribute generator 610 includes a format identifier 830 that identifies the category of text in which the token appears. The format identifier 830 operates according to a set of heuristic rules and glossary look-up and similar techniques to determine the category or type of text in which the token appears. For example, in sequence, the characters "<TITLE>" may indicate, based on the HTML vocabulary, that the following tokens are part of a title. When the format identifier 830 confirms the start of a title by noting the ">" character in the character string noted above, or by other means, a flag may be set to identify all tokens subsequently identified by the token identifier 810 as constituting parts of a title. Format identifier 830 may similarly turn off the flag upon confirming that the title has stopped, for example, by noting the last character of the string "</TITLE>". As shown in FIG. 8, the format identifier 830 inserts the title markers "[T]" after each of the tokens in the temporary linguistic array 630B to create the temporary linguistic array 630C. Format identifier 830 also advantageously identifies keywords that may have been entered by software developer 110 or other author of help file 700. For example, line 3 of FIG. 7 consists of a keyword entry in the HTML format indicating that help file 700 may be characterized by the keywords "font" and "font appearance." Such keywords, as seen, may consist of phrases as well as single words. They will hereafter be referred to as "manual" keywords. In help files not written in the HTML format, manual keywords may nonetheless be similarly identified by formatting characters or conventions used by such other formats, as is well known in the art. In addition to marking the tokens of a title or of other categories of text, format identifier 830 places the manual keywords 614, if any, and the file name and title 612, if any, in memory 216 so that such information will be available to keyword normalizer 670, as described below.

From the foregoing examples of the functions of the token identifier 810, sentence unit identifier 820 and format identifier 830, it should be understood that a variety of heuristics may be defined to determine when a sentence has begun or ended, when a token has been identified, and so on, depending on the format in which such language-based database is presented and other factors. As one skilled in the relevant art would find apparent, the format identifier 830 is not language-dependent while the token identifier 810 and sentence unit identifier 820 are typically language-dependent.

The token attribute generator 610 includes a position identifier 840 that identifies the position of each token in the help file currently being processed. The position identifier 840 provides information indicating the position of each token in accordance with one or more of a variety of known techniques. For example, offset of the first character in a token, as measured from any convenient reference point, as well as the length of the token, may uniquely define the token in the help file. This enables the token to be referenced later or otherwise identified and used. In the illustrative embodiment illustrated in FIG. 8, the position information inserted into the temporary linguistic array 630C by the position identifier 840 includes an "O," for offset, followed by an integer identifying the number of characters between the start of the help file 700 and the first character of the token. The position identifier 840 also preferably inserts a letter "L," for length, followed by an integer indicating the number of characters in the token. The determination and indication of other position-related information, whether relative or absolute, it is considered to be well-known in the art. Referring to the temporary linguistic array 630D created by the position identifier 840, the token "font" has the marker "[O15, L4]" adjacent to it indicating that the token is offset 15 characters from the start of the exemplary help file 700 and has a length of four characters.

As indicated by the dashed arrow 801, the token identifier 810, the sentence unit identifier 820, the format identifier 830 and the position identifier 840 operate at the character level of each token. That is, each character of a token is examined in accordance with the operations of each of these functional elements of the token attribute generator 610. It should be understood that the order in which these operations occur may vary in alternative embodiments. Such character-level examination and operations continue until the token identifier 810 determines that a complete token has been identified and a token is inserted sequentially into the temporary linguistic array 630. In another embodiment, control can be passed to the token level operations identified in FIG. 8 by dashed arrow 803 as soon as one or more tokens are processed. The token attribute generator 610 preferably include a layout identifier 850, a morphosyntactic identifier 860 and a special token identifier 870 which perform operations at the token level. As will become apparent to those skilled in the art, the order in which these operations are performed is or may be varied in alternative embodiments.

The layout identifier 850 uses well-known techniques to identify the location of the sentence in the help file. The layout identifier 850 identifies the first and subsequent sentence units in the help file by inserting into the temporary linguistic array 630D, the symbol "[S1]", for example, within the markers generated by the position identifier 840 to create the temporary linguistic array 630E. In a preferred embodiment, all the information related to a sentence unit will be kept in a subsidiary linguistic array (sentence array) that in the case of the keyword builder will remain until the whole file has been processed, to be used by the Topic Weight Calculator. Referring to the illustrative example above, the temporary linguistic array 630E contains the marker "[S1, O20, L30]" indicating that the group of tokens following the marker (that is, "to," "change," "the," "font," and "appearance") constitute the first sentence unit in the help file 700. Sentence 2 might then be similarly marked by the layout identifier 850. The layout identifier 850 may also identify the location of the sentence based on attributes that do not necessarily include an overt marker such as "<TITLE>". For example, layout identifier 850 may identify a group of words located in the first sentence of a file and containing all capital or initial capital letters as a title. Alternatively, a first sentence in a file followed by two or more end-of-line characters, or other indications setting off such a sentence unit for special attention, may be considered indicative of a title. Alternatively, if no other indicators are present, the first sentence in the file may be taken as a default title. It will be understood that a variety of other indicators or rules may be used to identify a title and other forms of sentences by the layout identifier 850.

Furthermore, layout identifier 850 may also identify that a group of tokens belongs to a particular paragraph, page, document, file, or other layout designation. The token attribute generator 610 includes a morphosyntactic identifier 860 that populates the temporary linguistic array 630 with all of the morphosyntactic information from the morphosyntactic dictionary 804 for each token in the array 630. The morphosyntactic identifier 860 inserts the morphosyntactic information into the temporary linguistic array 630E for each token in the array to result in the temporary linguistic array 630F. The insertion of such information by morphosyntactic identifier 860 into temporary linguistic array 630 is represented in FIG. 8 by the notation "[MI+R]," meaning "morphosyntactic information plus root." The content of the morphosyntactic dictionary 804 will generally be specific to the natural language of the help project 114 or the natural language query 160. Such dictionary may contain, for example, the following information with respect to the token "change": "[verb-[1sing-2sing-123plural-present]- infinitive-root:'change'] [noun-singular-root:'change'].". This entry may be understood to mean that the token "change" may be a verb in the present tense, first or second person singular; a verb in the present tense, first, second or third person plural; an infinitive verb form; or a singular noun; and that the root of the verb form is "change" and the root of the noun form is "change." It will be understood that the format in which this information is presented, and the structure or arrangement of morphosyntactic dictionary 804, are immaterial with respect to the present invention.

Preferably, the morphosyntactic dictionary 804 is accessed only once for each sentence unit with all of the morphosyntactic information for each of the tokens in that sentence unit entered into the temporary linguistic array 630 as a result of such access. For example, all of the morphosyntactic information in the morphosyntactic dictionary for each of the tokens "to," "change," "the," "font," and "appears" are retrieved from the dictionary during a single read operation for the sentence unit designated by the marker "[S1]". This morphosyntactic information is entered into the appropriate location associated with each token in the temporary linguistic array 630 during this single operation. Generally, more information may be transferred than will be used or needed in subsequent processing. It may be more efficient, however, to transfer such ultimately unneeded information than to repeatedly access the morphosyntactic dictionary 804 to obtain information that had not previously been transferred. This unneeded information can then be deleted from the temporary linguistic array 630 as discussed in the illustrative embodiment below. As one skilled in the relevant art would find apparent, instead of, or in addition to, placing such additional location information in the temporary linguistic array 630, such information may be advantageously stored in a separate data structure.

In a preferred embodiment, morphosyntactic dictionary 804 also contains common word misspellings. When a token is found to match a misspelling, morphosyntactic identifier 860 inserts the appropriate morphosyntactic information for the presumed correct spelling, with an indication that apparent inconsistencies may later be resolved by reverting to an unknown meaning for the token. For example, the token "the" may tentatively be entered in temporary linguistic array 630 as the word "the." If, however, further evaluation by syntactic tagger 620, as explained below, determines that such token is not likely to be a definite article, the token may be considered to be unknown. It will be understood that information regarding common misspellings may alternatively be contained in merged pattern dictionary 440. Also, as will be discussed below, misspellings may be corrected by morphological normalizer 1240, described below, although it may be advantageous to attempt to correct such errors at this earlier stage before various procedures described below are applied to a token representing a misspelled word.

The token attribute generator 610 preferably includes a special token identifier 870 that inserts information into temporary linguistic array 630 related to "special tokens" such as the character "@," the character "." followed by three characters, or any other character or combination of characters that may be of special interest, as will be apparent to those skilled in the art. For example, the "@" character in an HTML-formatted document may be indicative of an address for sending electronic mail, and the period followed by three characters may be indicative of a file name or an internet address. Thus, the token "carolina@novell.com," identified by token identifier 810 in the course of examining the characters that are represented in line 24 of FIG. 7, may be identified by special token identifier 870 as an electronic mail address. These and other special tokens, for example phone numbers, may be language-independent or not. Such information is then inserted by special token identifier 870 into temporary linguistic array 630. This enables a natural language query 160 inquiring about available electronic mail addresses for further help or comments to be associated with appropriate entries in help project 114. There are no special characters in the example section of the help file 700. Accordingly, linguistic array 630G has the same contents as linguistic array 630F.

Referring again to FIG. 6, the linguistic array generator 601 includes the syntactic tagger 620 which preferably performs its operations after the token attribute generator 610 completes the creation of the temporary linguistic array 630, as represented by the temporary linguistic array 630G discussed above with reference to FIG. 8. As noted, the syntactic tagger 620 supplements the temporary linguistic array 630 with morphological, syntactical and semantic data to identify the relative importance of each token in the array. The syntactic tagger 620 will be described in detail below with reference to FIG. 9.

Figure 9:
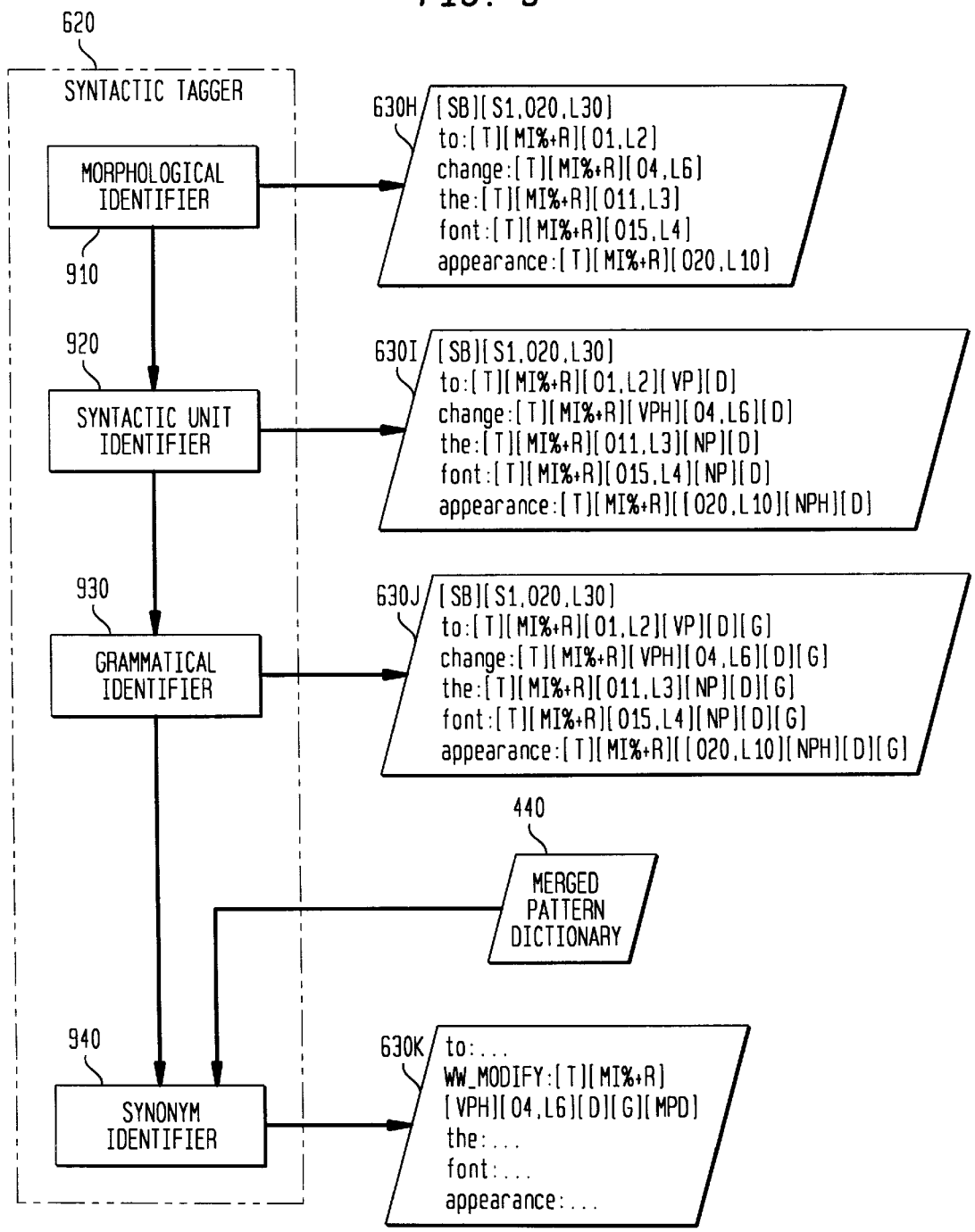
FIG. 9 is a functional block diagram of one embodiment of the syntactic tagger shown in FIG. 6.

FIG. 9 is a functional block diagram of one embodiment of the syntactic tagger 620. The syntactic tagger 620 includes a morphological identifier 910 that identifies the correct morphological form of each token in the temporary linguistic array 630G. The morphological identifier 910 analyzes each token in the temporary linguistic array 630G with respect to its neighboring and other tokens in the same sentence for the purpose of eliminating inappropriate morphological information. As noted, the morphosyntactic dictionary 804 typically contains the morphological and syntactic information for all forms of a token. This information has been transferred to the temporary linguistic array 630 for each of the tokens currently in the array and the sentence unit under consideration by the token attribute generator 610. The morphological identifier 910 implements well-known techniques to reduce this morphological and syntactic information where possible. Referring to the illustrative help file 700 and temporary linguistic array 630G, the token "change" may be identified in the temporary linguistic array 630G as both a noun and a verb. When preceded by the token "to," however, the likelihood of it use as a verb may generally exceed the likelihood of its use as a noun because the word "to" is frequently followed by an infinitive verb form. Also, syntactic analysis may reveal that there are no other verb forms in the sentence, and thus there is a greater likelihood that the token "change" is used in its verb form in this particular sentence unit. Based upon these determinations, the token "change" is characterized as a verb by the morphological identifier 910 which also eliminates from that entry in the temporary linguistic array 630G all references to other morphological forms for the token, such as all noun forms. Similarly, the morphological identifier 910 may determine that the token "change" is used as an infinitive, rather than, for instance, the first person, present tense, and thus, eliminate references to the latter morphological forms. This procedure of eliminating unlikely alternative morphological interpretations of a form is arbitrarily represented in FIG. 9 by the addition of the symbol "% " after the letters MI in the tag "[MI+R]" as shown in the temporary linguistic array 630H.

The syntactic tagger 620 includes a syntactic unit identifier 920 that identifies groups of tokens in syntactic units and identifies the dependencies among the tokens within each of these syntactic units. The syntactic unit identifier 920 utilizes well-known syntactical relationships to create syntactic units containing one or more syntactically-related tokens. In particular, the morphosyntactic information associated with each token in the temporary linguistic array 630H may be used to determine syntactic units. For example, morphosyntactic rules applied to the token "the," "font," and "appearance" in the temporary linguistic array 630H may identify these tokens as follows: "the: part of a noun phrase [NP];" "font: part of a noun phrase [NP];" and "appearance: head of a noun phrase [NP-HEAD]." This information is stored with each of the tokens in the temporary linguistic array 630H to create temporary linguistic array 630I as shown in FIG. 9. Furthermore, the syntactic unit identifier 920 includes additional information linking the three tokens together in the noun phrase: "the font appearance". The additional information specifies that "appearance" is the modified portion ("head") of the noun phrase of both the tokens "the" and "font." For example, the token "font" may further be identified by inserting for it a character string such as "DEP_PREM_NF" to indicate that the "font" token has "non-final premodifier dependency value." That is, the token "font" appears before another token, in this case "appearance," and the "font" token is not the final token in such a dependency. The final token is "the," which may further be identified by inserting a character string such as "DEP_PREM_F" indicating that it is the final token in such a dependency relationship. Such dependency values are illustrated in FIG. 9 as the entry "[D]" in the temporary linguistic array 630I. As will be described in detail below with respect to the syntactic filter 1010, the token "the" may subsequently be filtered out of temporary linguistic array 630 because it may be deduced that such a token does not contain important topic information. In such an event, the syntactic filter 101 may update the dependency values of affected tokens such as, in the illustrative example, by changing such values of the token, "font" from "DEP_PREM_NF" to "DEP_PREM_F." It will be understood that the representations of such dependency values by the character strengths of this example are illustrative only and that many variations are within the scope of the present invention.

The syntactic tagger 620 preferably includes a grammatical identifier 930 that identifies the grammatical function of each of the tokens in the linguistic array 630. The grammatical identifier 930 assigns well-known grammatical labels to the tokens of each syntactic unit. For example, the token "appearance" in the temporary linguistic array 630I may appropriately be assigned a designation "direct object". Grammatical function is determined for each token in the sentence unit; this is represented by tag "[G]" in array 630J. This information is included in the temporary linguistic array 630I for each token in the sentence unit, represented by tag "[G] " in array 630J.

One skilled in the relevant art would find apparent that the various techniques and methods for applying morphological and syntactical rules to tokens in order to eliminate inappropriate morphological designations, to create syntactic units and set dependencies, and identify syntactic functions; the weight or influence to be given to a particular rule in a particular situation; the rules for combining or assessing such weights; the thresholds that must be crossed to make a decision; and the decisions to be made as a result. Such variations may assume differing forms and contain differing content based on a number of factors including the natural language involved, the anticipated vocabulary or type of usage for typical help projects or natural language queries, and other factors.

The syntactic tagger 620 preferably includes a synonym identifier 940 that identifies a label representing a group of synonyms in the merged-phrased dictionary 440. The synonym identifier 940 substitutes lexical cluster identifiers for tokens that are entered in merged pattern dictionary 440. For example, the token "change," having been identified in the morphological identifier 910 as a verb form, may be compared, using one of a variety of known search and compare techniques, to an entry in merged pattern dictionary 440 associated with the verb "change." Such verb may be identified in the dictionary as belonging to a group of words, such as "vary," alter," and "modify," that may be represented by a common identifier, such as "WW_MODIFY." The elements of such group may, as previously noted with respect to FIG. 4, include an entry specified by software developer 110, or the existence of a group may be due to such an entry. The synonym identifier may advantageously be used to substitute the group identifier in place of the token, so that, for example, the token "change" is replaced in temporary linguistic array 630 by the token "WW_MODIFY." In this manner and to this extent, the tokens "change" and "alter" may be said to be functionally equivalent with respect to further procedures under this embodiment of the invention. For example, a natural language query 160 that is identified with the word "alter" may be associated with a help topic in help project 114 that is identified with the word "change." Although the operations described above with respect to block 940 need not depend on the natural language employed in the help project or the natural language query, the content of merged pattern dictionary 440 typically may so depend. As was described above with respect to accessing morphosyntactic dictionary 804, it is preferable to access merged pattern dictionary 440 only once for each sentence and to transfer all information for each token in the sentence from merged pattern dictionary 440 to temporary linguistic array 630 during the same read and write operation. Such information is shown in linguistic array 630K by the symbol [MPD], for merged pattern dictionary, within the entry for each token in temporary linguistic array 630K.

Referring again to FIG. 6, the linguistic array generator 601 includes a parse filter 625 that filters tokens from the temporary linguistic array 630 that are likely not to assist in the matching of topics from a natural language query with topics from a help file. The operations of the parse filter 625 are preferably performed after the performance of the operations of the token attribute generator 610 and syntactic tagger 620. The functions and operations of the parse filter 625 are described in detail below with reference to FIG. 10.

Figure 10:
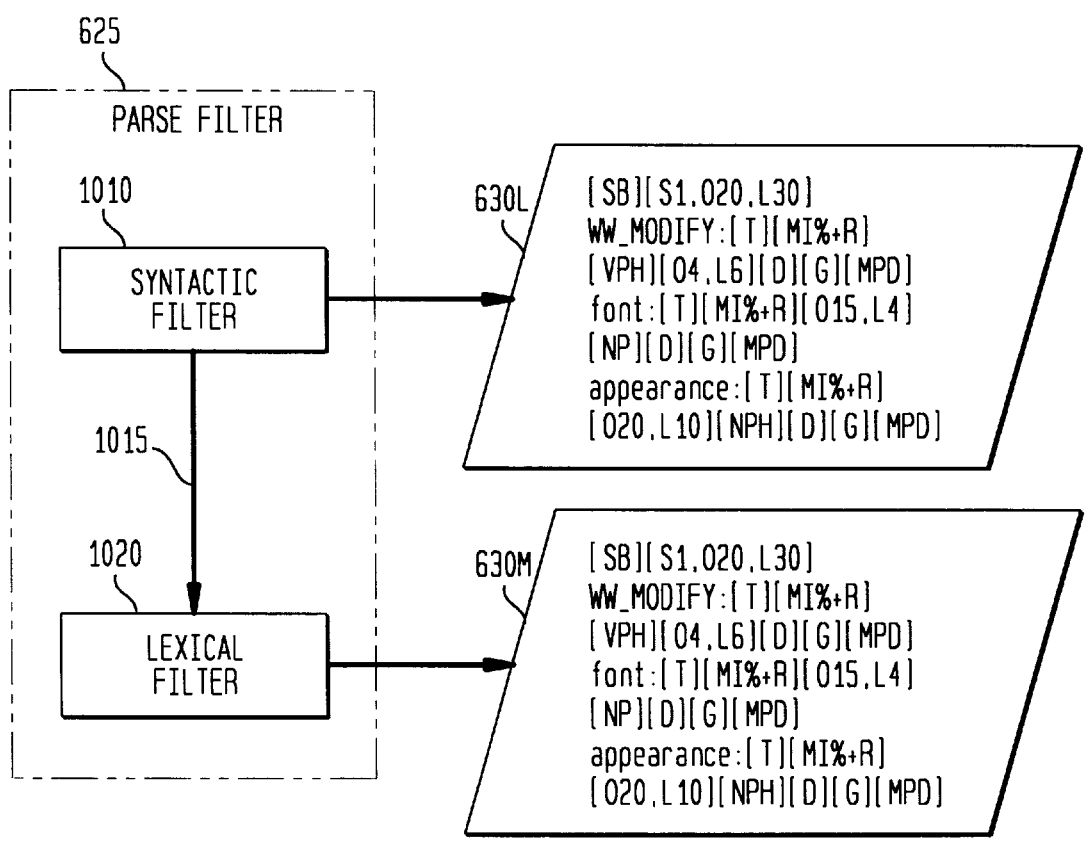
FIG. 10 is a functional block diagram of one embodiment of the parse filter shown in FIG. 6.

FIG. 10 is a functional block diagram of one embodiment of the parse filter 625. The parse filter 625 receives as an input the temporary linguistic array 630K generated by the syntactic tagger 620. The parse filter 625 preferably includes a syntactic filter 1010 that uses well-known techniques to syntactically evaluate each token in the temporary linguistic array 630K to determine if it is likely to convey information useful in identifying topics in the help project 114 or natural language query 160. The syntactic filter 1010 also syntactically filters tokens which are likely not to assist in the matching of topics of a query with those of the help files. In the illustrative embodiment, the syntactic filter 1010 operates on morphosyntactic information, referred to above by the tag "[MI+R]" (morphosyntactic information+root). As noted, this tag contains the morphosyntactic data retrieved from the morphosyntactic dictionary 804. The syntactic filter 1010 may be configured in any well-known manner to apply predetermined syntactic rules, with predetermined weights. As one skilled in the relevant art would find apparent, the techniques applied by the syntactic filter 1010 generally vary according to the natural language of the help project 114 or natural language query 160. For example, in the information retrieval system 199 it may be taken that a noun or verb as used in the English language is likely to be important, whereas any definite or indefinite article, or preposition, may be considered not likely to be important on its own. Thus, in the illustrative linguistic array 630K shown in FIG. 10, the tokens "to" and "the" may be assessed as not likely to be important and, therefore, may be eliminated from the temporary linguistic array 630K resulting in the temporary linguistic array 630L generated by the syntactic filters 1010.

In one embodiment, the parse filter 625 also includes a lexical filter 1020 to eliminate tokens associated with predetermined patterns. Such words, referred to as skip words, may be language/context-specific skip words or words identified by the software developer as not containing relevant information. Context-specific skip words are words that, based upon the context of the word, provide little or no information regarding the topic of the sentence unit. As one skilled in the relevant art would find apparent, such a determination is dependent upon the natural language implemented in the help project 114 or natural language query 160. The context-specific skip words along with the necessary contextual information, are preferably stored in the pattern dictionary 420 and added to the linguistic array 630 as part of the [MPD] tag. In this embodiment, the skip word information is available to the lexical filter 1020 by accessing this portion of the linguistic array 630L.

For example, the word "way" in the phrase "by the way" may be eliminated as a token from the linguistic array 630 by the lexical filter 1020 because it has been determined that such a word and such a phrase in the English language is not likely to be of assistance in matching topics from the query with topics in the help file. It should be noted that the context of the word considered by the lexical filter 1020 may extend beyond its immediate neighboring words. For example, the present invention is implemented for use in the context of a help database for computer software applications. In this embodiment, the lexical filter 1020 may be configured to eliminate the token associated with the word "click." The word "click" in a help project for computer software applications is likely to be ubiquitous and thus unlikely to assist with respect to identifying the topic of the help files in the help project 114. In help project 114, a user may be counseled to "click" on graphical representations of all or most functions described in the help project.

As a further example, the lexical filter 1020 may tentatively mark the word "manager" as unlikely to convey important information because it is a frequently-used term with a broad meaning. In a particular occurrence, however, such a token may be modified by the token "database" as a premodifier. Lexical filter 1020 may then retain the token "manager" by marking it by any of a variety of known methods as possibly containing important information based on its status as the modified portion ("head") of a noun phrase. The lexical filter 1020 preferably implements a "skip-words" procedure to eliminate tokens of the predetermined context-specific skip-words and those skip-words inserted by the software developer 110 into the merged pattern dictionary 440 through the use of expression list editor 310, as described above. As one skilled in the relevant art would find apparent, the syntactic filter 1010 and lexical filter 1020 may be implemented in a cooperative fashion to form the above-noted functions of the parse filter 625. Furthermore, it will be understood that many other indicators, rules or heuristics may be applied to determine the possible importance of a token-based either on syntactical or lexical considerations, or both. It will be further understood that many well-known techniques may be implemented to mark a token with respect to the potential degree of importance it may have whether conditions under which such importance may be realized.

Thus, the illustrative embodiment of the linguistic array generator 601 as illustrated in FIG. 6 includes the token attribute generator 610, syntactic tagger 620 and parse filter 625 which interoperate to create the temporary linguistic array 630. The temporary linguistic array 630 contains a preferred number of tokens representing words which identify topics in the help project 114 or natural language interface 160.

Referring again to FIG. 6, the topic tree builder 635 will now be described with reference to FIGS. 6 and 11. As noted, the topic tree builder 635 transfers the information from the temporary linguistic array 630 to the three linked data structures forming the topic tree 603 and groups the tokens in accordance with the topics they represent. As noted above, the linguistic array generator 601 operates on each sentence of each help file in the help project 114. Likewise, the topic tree builder 635 preferably transfers information from the temporary linguistic array 630 to the topic tree 603 for each sentence in the help file. As noted, information regarding tokens may advantageously be entered for each sentence into the temporary linguistic array 630 by the linguistic array generator 601 and then such array may be overwritten when the next sentence is similarly processed by the linguistic array generator 601. At each such a duration, the topic tree builder 635 preferably accumulatively transfers appropriate data to the three permanent data structures constituting the topic tree 603.

Figure 11:
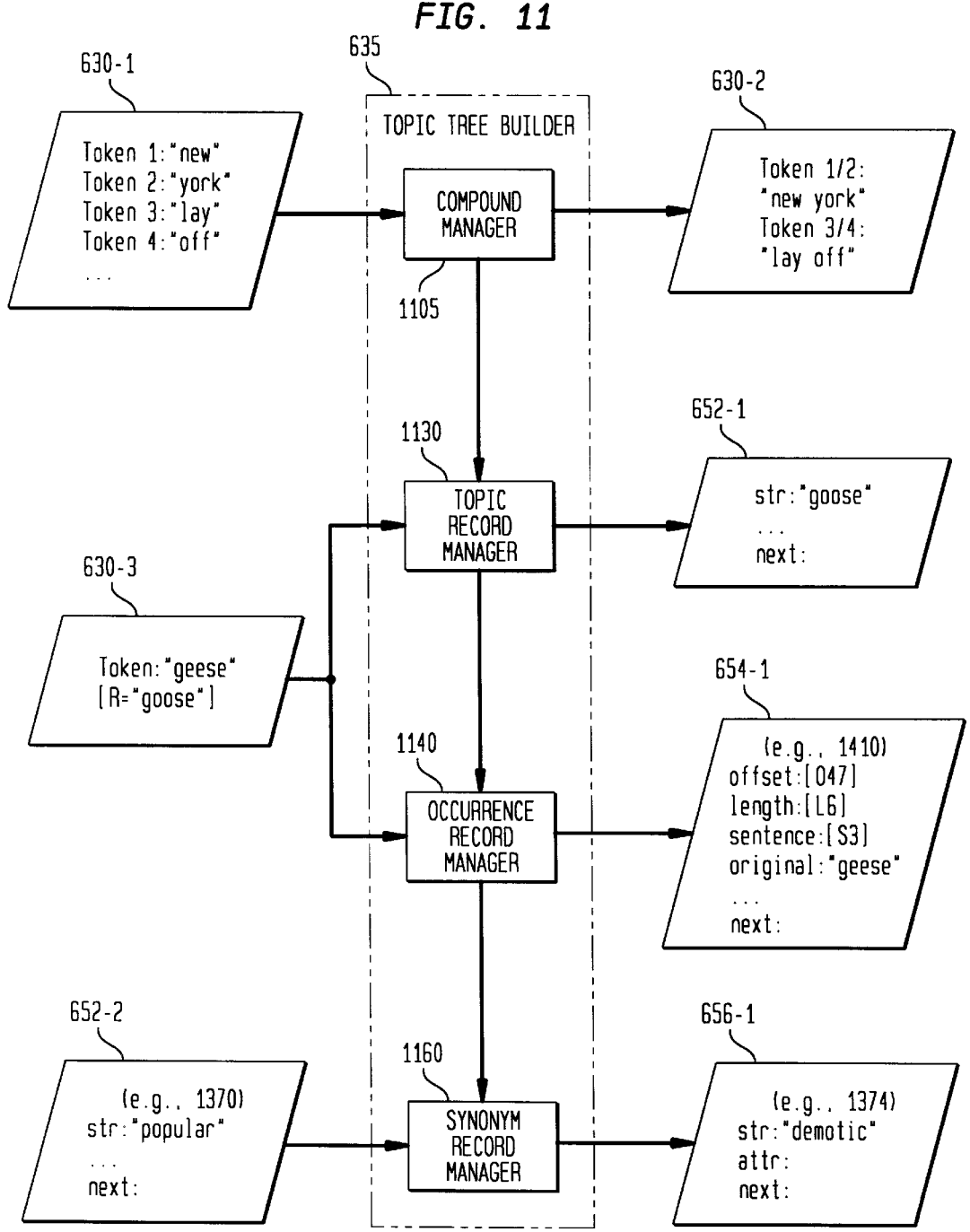
FIG. 11 is a functional block diagram of one embodiment of the topic tree builder shown in FIG. 6.

Referring to FIG. 11, the topic tree builder 635 preferably includes a compound handler 1105 that creates compounds of two or more related tokens. Significantly, the compound handler 1105 assigns predetermined weights to these compounds. Those with a lower weight, referred to as weak compounds, remain as separate tokens while compounds assigned higher weights, referred to as strong compounds, are combined into a single token in the temporary linguistic array 630. For this purpose, the compound handler 1105 may make use of weak and strong compound information stored in temporary linguistic array 630 that had previously been read, as noted above, from merged pattern dictionary 440 and morphosyntactic dictionary 804. Such information may identify, for example, the words "new" and "york" as potentially occurring as components of the same noun phrase, "new york." Such strong compound may be treated as a single token, as shown in FIG. 11. Compound handler 1105 may also advantageously identify in a similar manner "weak" compounds, such as might be comprised of the tokens "high" and "school." The difference between strong and weak compounds lies in the informative value of the individual tokens. In isolation, the token "York" does not likely refer to New York, whereas the isolated token "school" might still refer to a high school. It will be understood that the determination whether compounds should be classified and treated as "strong," "weak," or according to another scheme may be based on any of a variety of factors including the subject matter context of help project 114 or natural language query 160. In the present embodiment, tokens of a weak compound may be preserved as separate tokens, but marked for extra weight, as described below with respect to topic calculus 640.

Similarly, the compound handler 1105 may combine two or more words that constitute a verbal phrase. The compound handler 1105 consults morphosyntactic dictionary 804 to identify two or more tokens, for example, "lay" and "off," occurring as components of the same verbal phrase. Such tokens may constitute a compound that may be treated as a single token as shown by the temporary linguistic arrays 630-1 and 630-2 in FIG. 11. The morphosyntactic dictionary 804 includes such phrases in a table format accessed by the compound handler 1105 in any well-known manner.

The topic tree builder 635 also preferably includes a topic record manager 1130, and occurrence record manager 1140 and a synonym record manager 1160, each configured to create and modify records in their respective data structures 652, 654 and 656, respectively. In order more fully to explain the operations by which a topic tree may be built in accordance with the present invention, an illustrative example of a help file that is more extensive than the font.hlp file of help project 114 will be used. This illustrative help file, which may be referred to as the "poetry.hlp" file, is written in the English language and relates to medieval Dutch poetry. The poetry.hlp file has been operated upon as described above with respect to FIGS. 6–11. That is, successive sentences of the poetry.hlp file have been operated upon to produce, for each such sentence in temporary linguistic array 630, a structure analogous to that shown as the output of lexical filter 1020 of FIG. 10.

Upon receipt of a token from the compound handler 1105, the topic record manager 1130 determines whether a topic record has been created for this token. The topic record manager 1130 makes this determination based upon the token and the dependency value [D] assigned to the token. If the particular token being operated upon has not previously been added to the topic tree 603 during earlier processing in the current sentence unit, or in a sentence unit previously processed, then the topic record manager 1130 is evoked. Otherwise, the topic record already exists and the topic record manager 1130 increments a counter (discussed below) indicating the number of occurrences of this particular token (with this dependency value) in the help project 114. Taking the poetry.hlp file as an example, if the token under consideration is a token "poetry," and among the information stored with the token in temporary linguistic array 630 is that the token is a noun with the dependency value "head", at the first occurrence of this token the topic record manager 1130 creates an associated record in the topic data structure 652. The topic record manager 1130 uses the token and accompanying morphosyntactic and positional information in the temporary linguistic array 630 to create a topic record for the token "poetry" in the topic data structure 652 as shown by the exemplary topic data structure 652-1 in FIG. 11. Once the token is normalized in a manner described below, the token the topic record is referred to as a "topic".

Figure 13:
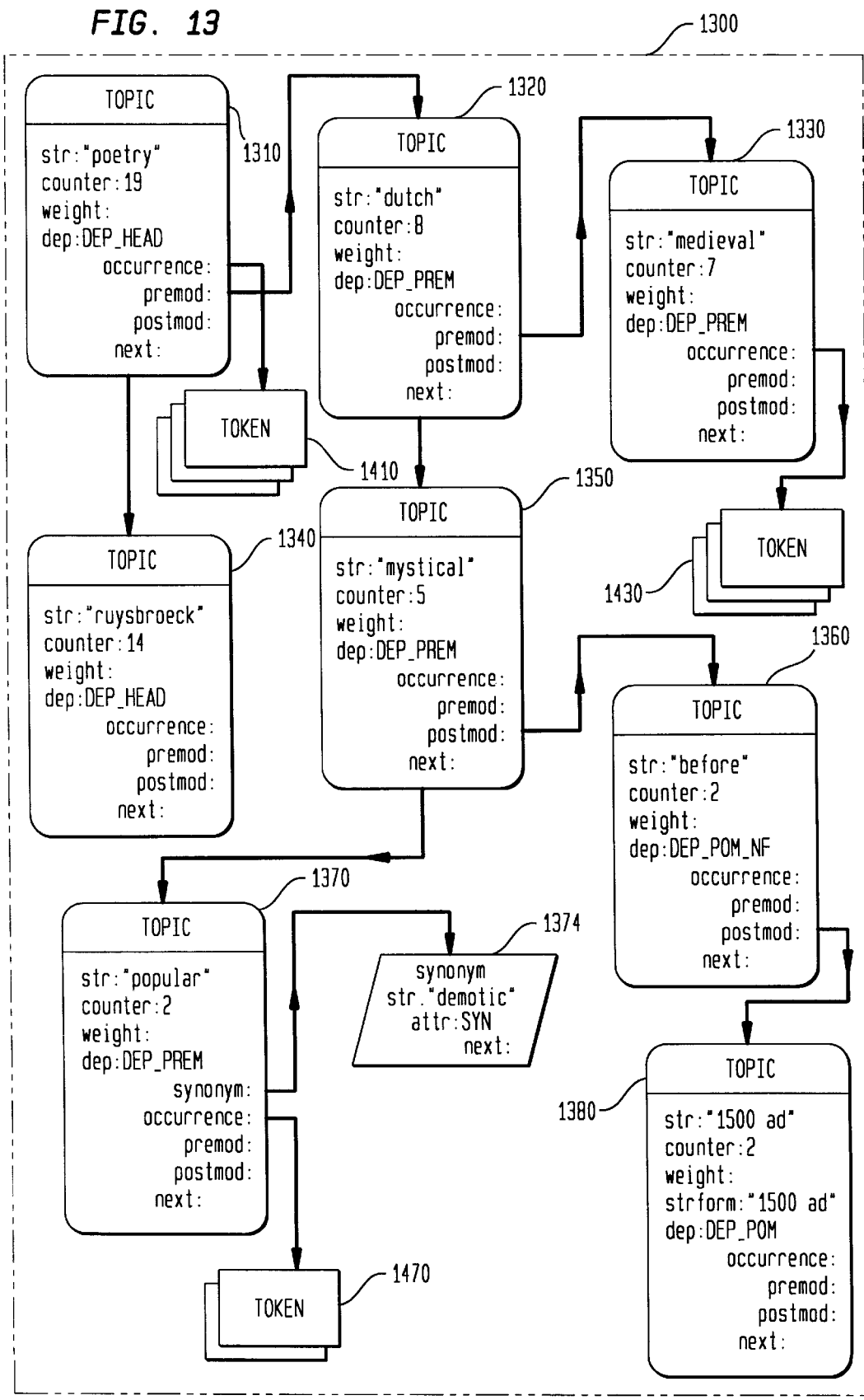
FIG. 13 is an exemplary portion of the topic data structure and synonym data structure shown in FIG. 6.

FIG. 13 illustrates portions of a topic data structure 652 after a number of tokens of the poetry.hlp file, contained in a one sentence unit or many, have been processed by the topic record manager 1130. The topic record manager 1130 has, for the first occurrence of the token "poetry" inserted such token in a topic string field "STR" of a topic record 1310. As described above, the counter field in the topic record 1310 has been updated by the topic record manager of 1120 to the number 19, to indicate that there have been 19 occurrences of the token "poetry" with dependency value of "head". As shown, the dependency value (dep) associated with the token is recorded in the topic record 1310. No entry has been made in the "weight" field of the topic record 1310 at this point in time. The use of such a field will be described below with reference to the operations of the topic calculus 640. If a subsequent occurrence of the token "poetry" is encountered having a different dependency value, that is, the value other than "head", for instance in the noun phrase "poetry section", then the topic manager 1120 will determine whether a premodifying topic linked to the head topic "section" already exists. If it does not, a new topic with dependency value "premodifier" is created, and linked to head topic "section" at the appropriate place.

Similarly, topic record 1320 indicates that the token "dutch" has occurred eight times in the sentence unit currently under examination or any sentence unit previously examined. In all eight such occurrences, the token "dutch" has had a dependency value of "premodifier" in relation to the token "poetry." Thus, topic record 1320 is linked to topic record 1310 by the placement of a pointer to topic record 1320 in the "premod" field of topic record 1310. It will be understood that such a linkage arrangement is one of many that could be used to so link the two topics. If the token "dutch" had a postmodifier relationship with the token "poetry," then a pointer to such postmodifier would have been placed in the "postmod" field of topic record 1310.

Similarly, if a new topic is identified by the topic record manager 1130 based on the token "dutch," itself depending on "poetry", such new topic will be linked to the "dutch" topic by a pointer to the new topic in the "premod" field of the "dutch" topic. Such a situation is represented in FIG. 13 by the arrow from the "premod" field of topic record 1320 to topic record 1330. This arrow, and the entry "7" in the "counter" field of topic record 1330, indicates that the topic "medieval" has occurred seven times in a premodification dependency relationship with the token "dutch", itself depending on "poetry". Such chains of linkages may be continued to any depth necessary.

If a new topic has the same dependency value as another topic, and the two depend from a common topic, then a pointer to the new topic may be established in the "next" field of such other topic record. Such a relationship is shown, for example, by the arrow between topic record 1320 and topic record 1350, where the pointer to topic 1350 is stored in the "next" field of the topic record 1320. Thus, the topic "mystical" may be seen to have occurred five times, having a premodification dependency value with respect to the topic "poetry." If a new topic has a dependency value of "head," i.e., does not depend from another topic, then it may be linked with the topic immediately preceding it alphabetically that also has a "head" dependency value. This alphabetical linkage is equally performed for head topics and modifying topics, and is accomplished by placing a pointer to such new topic in the "next" field of the topic record having a topic string that immediately precedes the topic string of the new topic in alphabetical order. For example, the topic "ruysbroeck" is shown in FIG. 13 as linked to the topic "poetry" by a pointer to topic record 1340 entered in the "next" field of topic record 1310. It may thus be presumed that, at the stage of processing shown in FIG. 13, there are no topics alphabetically between "poetry" and "ruysbroeck." The first topic record in alphabetical order will thus not be so linked to any preceding topic record.

Referring again to FIG. 11, the occurrence record manager 1140 creates an occurrence record in the occurrence data structure 654 to retain certain information regarding each occurrence of a topic. Thus, if the token "poetry" occurs 19 times as a head in the poetry.hlp file, whether in one sentence or more, such a counter will have been incremented to the value "19", so that notwithstanding the fact that the token "poetry" occurs 19 times as a head, there can thus be only one "topic" identified by the character string "poetry" in the topic data structure 652. There will, however, be 19 records in the occurrence data structure 654 recording such occurrences.

Figure 14:
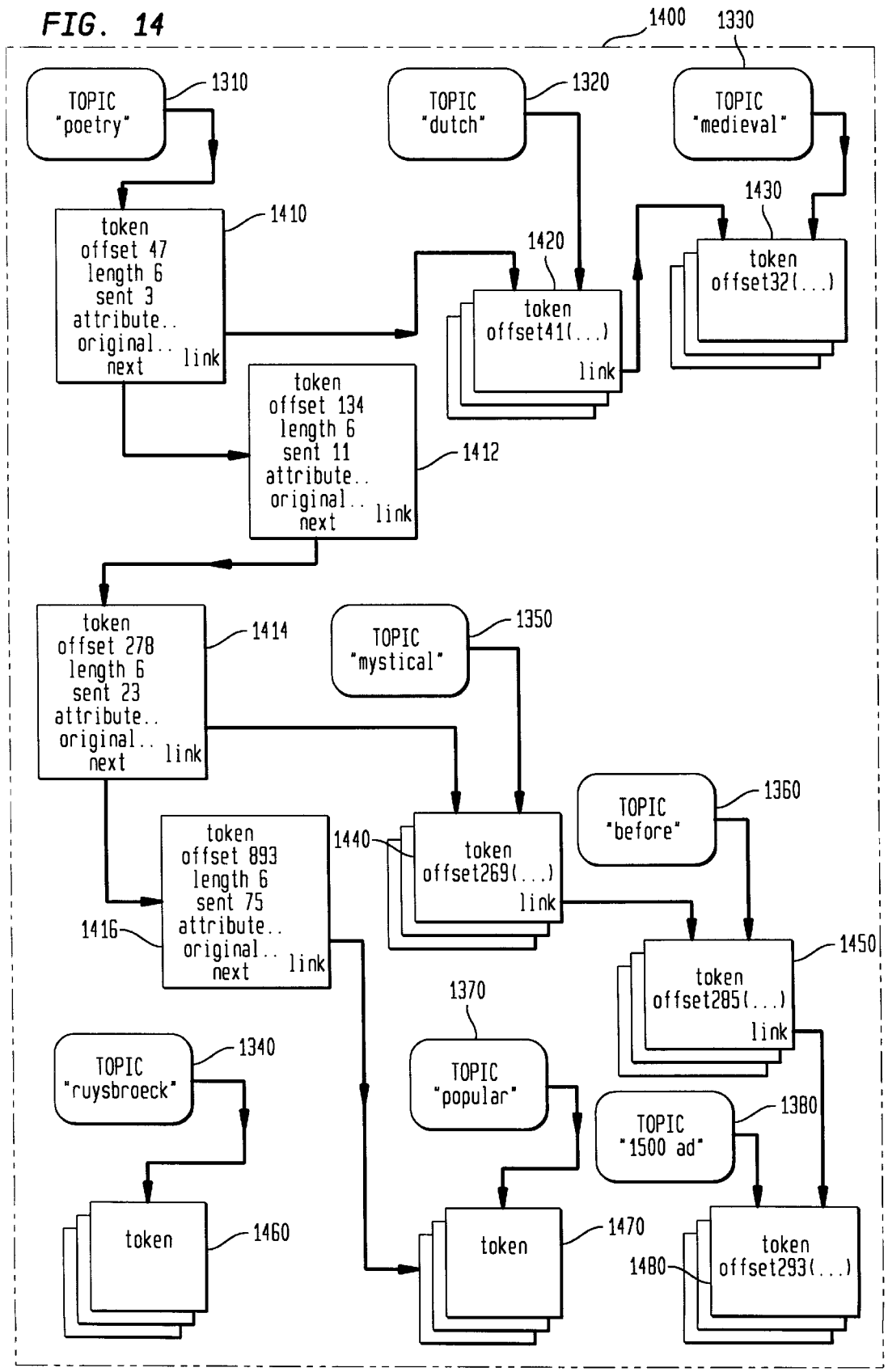
FIG. 14 is an exemplary portion of the occurrence data structure shown in FIG. 6.

FIG. 14 provides an illustrative partial representation of the occurrence data structure 654 generated by the occurrence record manager 1140. It may be noted that each occurrence record preserves the location information, i.e., offset, length, and sentence number, for each token of temporary linguistic array 630 entered into topic data structure 652, even though temporary linguistic array 630 may be overwritten after each sentence has been processed. It will be understood that other layout information, not shown, such as paragraph number, file number, and so on, might also be so preserved in other data structures by the occurrence record manager 1140.

Each subsequent occurrence of a token may be linked to the previous occurrence of that token through the "next" field of the previous occurrence. For example, block 1410 of FIGS. 13 and 14 represents one entry of the token "poetry" in the occurrence data structure, corresponding to one occurrence of the topic "poetry" represented in topic data record 1310. In like manner, as indicated by blocks 1412, 1414 and 1416, this procedure may be repeated so that all 19 occurrences of the token "poetry" are linked through their respective "next" fields in the occurrence data structure. Unlike the order of linkages in the topic tree data structure as described above, links in the occurrence data structure are made according to the order in which the occurrences are processed, not in alphabetical order. It may also be noted that links may be created in the occurrence data structure using the "link" field. Such a link is shown, for example, between block 1430 and block 1420, and represents a dependency of an occurrence of the token "medieval" on an occurrence of the token "dutch," respectively. The occurrence record 1420 similarly is linked to an occurrence of the token "poetry," upon which it is dependent, as shown by the arrow from the "link" field of occurrence record 1410 to occurrence record 1420. The attribute field in each occurrence record is used to record other attributes of the subject token, for example its part of speech, whether it is part of a strong or weak compound phrase, or layout information such as whether it is part of a title may be represented by attributes. As described below, such information may be used by topic tree pruner or by topic calculus 640 in determining whether and how to prune topics from the topic tree.

Referring again to FIG. 11, the synonym record manager 1160 populates the synonym data structure 656 to preserve synonyms in the topic tree 603. The synonym record manager 1160 determines whether the temporary linguistic array 630 includes any tokens with a common identifier. As noted above with reference to the synonym identifier 940, common identifiers are provided in the merged-pattern dictionary 440. The common identifier, if in existence, is inserted into the linguistic array 630 in place of the token word when that word has one or more synonyms. Portions of the synonym data structure 656 is shown in FIG. 13 at blocks 1370 and 1374 to illustrate the relationship between the synonym data structure 656 and the other data structures in the topic tree 603.

Referring to FIG. 13, the token "popular" inserted into the string field of the topic record 1370 may be represented in the temporary linguistic array 630 by a common identifier, such as WW-POPULAR. In this illustrative example, the merged-pattern dictionary 440 includes the word "DEMOTIC" as a synonym of the word "POPULAR", and associates both with the common identifier "WW_POPULAR." The synonym record manager 1160 creates a new synonym record 1374 for the synonym "DEMOTIC" linked to topic record 1370 by a pointer in the "synonym" filed of the topic record 1370. Additional synonyms may be linked to topic record 1370 by pointers in the "next" of the previously-identified synonym.

Such operations as described above may be conducted with respect to every token in poetry.hlp, thereby creating the topic tree 603 partially represented by FIGS. 13 and 14. An examination of FIG. 13 discloses that in eight of 19 occurrences, the token "poetry" (block 1310) was preceded by the premodifier "dutch" (block 1320), which was in its turn preceded by the token "medieval" (block 1330) in seven occurrences. From the premodifying topic record "dutch" (block 1320), a pointer in the "next" field links to another premodifier, "mystical" (block 1350). Pointers from this record lead to a postmodifier chain, "before" (block 1360) and compound topic "1500 ad" (block 1380), and yet another premodifier, "popular" (block 1370). Also, as noted above, another topic record, "ruysbroeck" (block 1340), is linked to the topic record "poetry" (block 1310) through the latter's "next" pointer. It may be noted that postmodifiers hang from the last premodifier in the topic tree. Such arrangement is one technique by which it may be assured that the distinction between, for example, "poetry before 1500 AD" and "mystical poetry before 1500 AD" is not lost.

It may be seen from the foregoing, as extended to the remainder of FIG. 13, that a list of potential topics to characterize the poetry.hlp file may be directly produced from the topic tree 603. In particular, the following potential topics listed in Table 1, below, and only such list, may be responsible for the topic data structure of FIG. 13 in accordance with the present invention described above. The numbers in the second column indicate the number of occurrences of the associated potential topics:

TABLE 1

| Potential Topic | Number of Occurrences of the Potential Topic in FIG. 13 |
| --- | --- |
| medieval Dutch poetry | 7 |
| Dutch poetry | 1 |
| mystical poetry before 1500 AD | 2 |
| mystical poetry | 3 |
| popular poetry | 2 |
| demotic poetry | 2 |
| poetry | 4 |
| Ruysbroeck | 14 |

The derivation of this table is described with reference to a sample of the entries in the table. As indicated by topic record 1330, the premodifier "medieval" premodifies "dutch" seven times, and "dutch" premodifies "poetry" eight times. Thus, the noun phrase "medieval dutch poetry" must have occurred seven times and the noun phrase "dutch poetry" must have occurred one time. The premodifier "mystical", with a counter value of 5, is linked to the "next" field of "dutch," indicating that it does not premodify or postmodify the latter, but is related in the same way as "dutch" to "poetry," i.e., as a premodifier. Thus, "mystical" must premodify "poetry" five times. As seen by following the postmodification field of "mystical," for two occurrences the premodifier "mystical" appears with the postmodifier "before 1500 ad," thus resulting in two occurrences of "mystical poetry before 1500 ad." Because "mystical" modifies "poetry" five times, the remaining three premodifications must be in the form "mystical poetry." Thus, by following the linkages in the topic data structure, as augmented by the synonym data structure, a list such as that of Table 1 can readily be constructed that accurately represents the occurrences of words and phrases as they have been used in the source help project 114 or natural query 160 and processed according to the various operations described above. The words and phrases that may be so reconstructed from the topic tree represent potentially significant topics that characterize the information in help project 114 or natural language query 160.

In an alternative embodiment, the key word builder 510 also includes a topic tree pruner (not shown). The topic tree pruner protects against the possibility that a very large help project 114 will result in the generation of a topic tree 603 so large that an undue burden is placed on the memory storage resources of software development computer 210. The topic tree pruner will only be invoked when the size of the topic tree 603 becomes larger than a predetermined size. This predetermined size may be based upon well-known factors such as those related to system requirements. If the topic tree pruner is invoked, it will rank the topic records in the topic data structure 652 according to their counter value. The least important topics may then be pruned from the topic tree.

Referring again to FIG. 6, the foregoing operations with respect to the linguistic array generator 601 and topic tree builder 635, resulting in the creation of the topic tree, is preferably repeated for each sentence of a file in the help project 114. The topic prioritizer 602 performs its operations once the topic tree 603 is completed for one such file in the help project 114. As noted, the topic prioritizer 602 prioritizes the normalized topics in the topic tree in accordance with the frequency of their occurrences and other indicators of their importance inferred from their token attributes. Thus, the topic prioritizer 602 preferably operates on the topic tree 603 representing a complete file in the help project 114, such as the font.hlp file 700 or the poetry.hlp file. This approach is preferred because it enables the topic prioritizer 602 to determine a relative measure of importance of each potential topic identified and stored in the topic tree 603 in its relation to all other potential topics so identified and stored for the currently processed help file. It will be understood, however, that in alternative embodiments, the topic prioritizer 602 is applied at a level below that of the complete source document (that is, the complete help file). In such an embodiment, the topic prioritizer 602 is applied to sentences, paragraphs, or other lower levels. In an alternative embodiment, the topic prioritizer 602 is applied at a level above that of the source document. In this embodiment, the topic prioritizer 602 may be applied to the entire help project 114.

The topic prioritizer 602 preferably includes a token weight calculator 640 that prioritizes the topics in the topic tree in accordance with the frequency of their occurrence and other indicators of their importance inferred from their token attributes. The topic prioritizer 602 also includes a topic normalizer 650 that determines the most appropriate morphosyntactic and typographical form for each of the topic names based upon the form that occurred most frequently in the help file for that topic.

Figure 15:
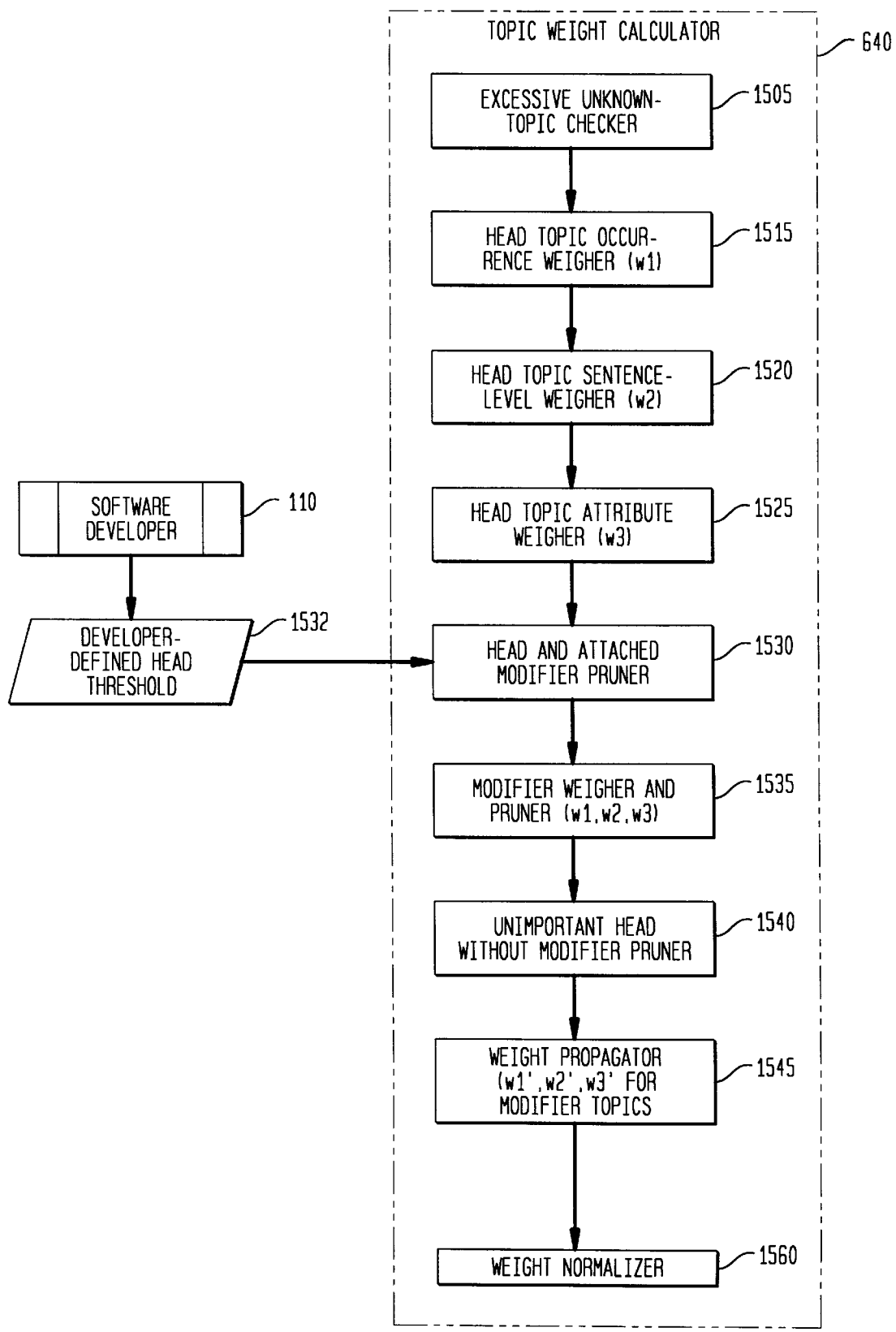
FIG. 15 is a functional block diagram of one embodiment of the topic weight calculator shown in FIG. 6.

The topic weight calculator 640 arranges topics in the topic tree in accordance with their importance, based upon criteria described below. In an alternative embodiment, the topic weight calculator 640 also prunes the topic tree 603 to eliminate less important topics. The pruning function of the topic calculator 640 is thus undertaken for a different reason than the pruning function described above with reference to the topic tree pruner. The weighing and pruning functions of the topic weight calculator 640 are described in greater detail below with reference to FIG. 15. FIG. 15 is a functional block diagram of the topic tree calculator 640. As noted above, a token may remain unknown after evaluation by syntactic tagger 620. For example, the transliterated Russian word "Mir" may appear in a help project involving the Russian space station of that name. This token will not be discarded, but will remain in temporary linguistic array 630 and then be stored in the topic tree in accordance with the processes described above. The reason that the token "Mir" is not discarded is that it may represent an important topic, as is often the case with an unknown word. The potential importance of an unknown word is due to the fact that such a word will often be a proper name or other unique word that may distinctively identify a topic to which it is related. An unknown word may also occur, however, because the help project or other source file is corrupted so that intended characters are not accurately represented. Similarly, the source file may be written in an unfamiliar character set. Also, the source file may not be a natural language file, but instead may be a binary or other file in non-text format. In such cases, all or most of the tokens, and thus topics, produced in accordance with the functions described above may be unknown. The function of an excessive unknown-topic checker 1505 identifies a condition of excessive unknown topics. It is not material how the threshold is determined. If the threshold is exceeded, however, a variety of actions may be taken in accordance with known error-condition programming. For example, detection of excessive topics by the topic checker 1505 may result in a termination of processing of the help file, notification to software developer 110 of the termination and reason therefor, and inquiry to the software developer respecting whether processing of the next help file, if any, should proceed, all in accordance with known techniques.

The topic weight calculator 640 includes a number of weighers and modifiers for assigning a weight to each topic in the topic tree. This topic weight, once calculated as described below, is entered in the "weight" field of a topic record, such as topic record 1310 of FIG. 13. The topic weight is calculated by combining various weight elements for each topic. Each weight element is intended as a measure of the importance of the topic based on information about the topic stored in its topic record and occurrence records of topic data structure 652 and occurrence data structure 654, respectively.

For example, head topic occurrence weigher 1515 of FIG. 15 represents the operation of assessing a first weight element (w1) for the topic under consideration. The use of the adjective "first" is for convenience only and does not denote that this function must be performed before the others of FIG. 15. The value of w1 is based on whether or not the topic has a dependency value of "head" (such a topic hereafter referred to as a "head topic") and then, if so, on the number of occurrences of such topic in the topic tree. The number of occurrences, as noted above, is recorded in the "counter" field of each topic record in topic data structure 652. Any of a variety of known systems of assigning weight values may be used. For example, if a topic is not a head topic, w1 may be 0. If the topic is a head topic, and occurs more frequently than 90 percent of the topics in the topic tree, it may be given a value of 9; if more than 80 percent and less than or equal to 90 percent, a value of 8, and so on.

Head topic sentence-level weigher 1520 also performs operations related to the weighing of head topics. It represents the operation of assigning a weight element, which may be designated w2, based on the positions of the sentences in which the tokens that gave rise to the head topics appeared. The information needed to make this determination is contained in the "attribute" field of the occurrence records of FIG. 14, or in the preferred embodiment in a subsidiary sentence array in which all the sentence related information is stored and which can be reached by means of pointers from the occurrence records. For example, occurrence records 1410, 1412, 1414, and so on each contain in their respective "attribute" fields information regarding the position of the token "poetry" for all of its 19 occurrences in the poetry.hlp file. Occurrence record 1410 may indicate, for example, that in its first occurrence the token "poetry" appeared in a sentence that was a title. Such information may have been provided by temporary linguistic array generator 601, as described above, or, preferably, directly accessed from the subsidiary sentence array. Similarly, another occurrence record may indicate that the token "poetry" appeared in a sentence that was the first sentence in a paragraph, or that was underlined, or contained a list, and so on. Such indications of the possible importance of the token, inferred from information in the "attribute" field regarding the position or other characteristic of the sentence in which the token appeared, may contribute to a determination of a value for weight element w2. Many possible schemes for calculating w2 may be used, as will be evident to those skilled in the art.

A head topic attribute weigher 1525, which also relates to head topics, represents the operation of assigning a weight element, which may be designated w3, also based on information in the "attribute" field of the occurrence records of FIG. 14. For example, occurrence records 1410, 1412, 1414, and so on each contain in their respective "attribute" fields information regarding the part of speech or grammatical usage of the token "poetry" in that occurrence, for example whether it occurred as a subject, direct object, a proper noun, and so on. Also, each occurrence record may indicate that the token "poetry" was highlighted in some way, such as being underlined, in bold font, capitalized, and so on, as described above with respect to temporary linguistic array generator 601. Such indications of the possible importance of the token may contribute to a determination of a value for weight element w3. Many possible schemes for calculating w3 may be used, as will be evident to those skilled in the art.

Head and attached modifier pruner 1530 represents a pruning operation that may conveniently be undertaken before further weighing, although the order of weighing and pruning may differ in another embodiment. As indicated in FIG. 15, software developer 110 may be prompted or allowed, by use of a graphical user interface or other known technique, to indicate an integer number representing the maximum number of topic heads to be included in a topic tree. The purpose of head pruner 1530 is to prune from the topic tree those topic heads that have weights, as indicated by w1, w2, and w3, below a threshold value related to the developer-defined threshold. Any of a variety of known techniques may be used for this purpose. For example, w1, w2, and w3 for each topic in the topic tree may be combined taking into account, in a variety of ways known to those skilled in the art, the presumed relative importance of the factors that gave rise to them. If the developer-defined threshold is 10, and there are 25 head topics in the topic tree, then the 15 head topics having the lowest combined value for w1, w2, and w3 may be pruned, in a manner described below.

A modifier weigher and pruner 1535 represents the operation of calculating weight elements w1, w2, and w3, as described above in relation to head topics, for topics that are not head topics. Such non-head topics are either postmodifiers or premodifiers of a head topic and thus may be referred to as "modifier topics." The reason to calculate such weights for modifier topics separate from the weight calculations for the head topics described above is that such effort would be wasted for those modifier topics pruned as a result of the operation of head pruner 1530. After the calculation is completed, a pruning operation may be undertaken to eliminate the less important modifiers from each topic branch. The pruning proceeds in much the same way as described above for head pruner 1530.

An unimportant head without modifier pruner 1540 represents the operation of pruning head topics that have been marked as possibly unimportant and that are not linked to any modifier topic. For example, as noted above, lexical filter 1020 may tentatively have marked the token "manager" as unlikely to convey important information because it is a frequently used term with a broad meaning. Such marker would have been entered by lexical filter 1020 into temporary linguistic array 630 and then transferred to the attribute field of the occurrence data record for the head topic "manager" as described above. If in such occurrence, the token "manager" had been modified, for example by the adjective "database" as explained above, a topic record for the token "database" would be linked to the topic record for "manager." This linkage would have been accomplished by means of a pointer to the "database" record in the premodification field of the "manager" record, as described above. Because the head topic "manager" was linked to modifier topic "database," it would not be pruned in accordance with the pruner 1540 even though the token "manager" had been marked by lexical filter 1020 as potentially unimportant. If, however, all modifiers were pruned, then the pruner 1540 would prune the head topic manager.

Pruning in accordance with the pruners 1530, 1535 and 1540 of FIG. 15 may be accomplished in various ways that are known to those in the art. For example, if a topic, i.e., a topic record in topic data structure 652, is to be pruned, then all topics that are depending on it will be pruned as well, with one exception that will be described below. If the premodifier "dutch" is pruned in FIG. 13, then the premodifier "mystical" will be pruned as well. That is, the topic records for "dutch" and "medieval" together with all their linked occurrence records will be deleted. The exception mentioned above is the postmodifier topic linked to a premodifier topic, like in FIG. 13 "before" is linked to "mystical". If "mystical" is pruned as a premodifier to "poetry", the postmodifier "before" is not pruned with it, but instead moved up to the same topic that "mystical" depends on. So, after pruning "mystical", the postmodifying chain "before 1500 ad" has survived, now directly linked to its head "poetry". Similarly, if a head topic is to be pruned, then the pointer to it in the "next" field of the preceding head topic will be replaced by a pointer to the subsequent head topic. In the example of head topics "A," "B," and "C," and considering that in this embodiment topic records are arranged in alphabetical order, the head topic "B" may be pruned by changing the pointer in the topic record for "A" from "B" to "C." The occurrence records for head topic "B" and for all topics dependent from it, and then the topic records for all such dependent topics and for "B" itself, may then be pruned in the manner described above.

Returning to FIG. 15, a weight propagator 1545 represents the operation of altering the weights derived as described above for modifier topics based on the weight derived as described above for the head topic that they modify. The purpose of the weight propagator 1545 is to provide that the importance of a head topic will influence the importance of its modifier topics, either by increasing or decreasing the weights of the latter based on the importance or unimportance of the head topic, respectively. For example, it may be assumed for illustration that the topic head "poetry" has a weight (representing either a combination of w1, w2, and w3, or any one of them, as described below) of 8 on a scale of 1 to 10, where 10 signifies the most important topics. The modifier topics of "poetry," as shown in FIG. 13, are "dutch," "medieval," and "poetry," which may be assumed for illustration to have weights of 2, 4, and 6, respectively. Any of a variety of known schemes may be used to modify the weights of the modifier topics in accordance with the weight of their head topic. One procedure would be to increase or decrease the weights of the modified topics by ten percent for every point of the weight of the topic head above or below 5, respectively, rounded to the nearest integer between 1 and 10. Thus, since 8 is 3 points above 5, the weights of the modified topics would be increased by 30 percent, with rounding, to the values of 3, 5, and 8, respectively. Whether the preceding operation is carried out separately for each of the weight elements, or is carried out on their combination, is a matter of preference. In the present embodiment, such operation is carried out separately, resulting in altered weight elements w1', w2', and w3' for each modifier topic.

A weight normalizer 1560 orders the weights assigned to each of the topics in topic data structure 652 so that they are spread over a scale that facilitates comparison. Any of a variety of known methods or procedures may be used. For example, Table 2 shows weights for each head topic and modifier topic in an illustrative topic tree before and after normalization. The numbers in the first column of the table are derived by combining weight elements w1 through w4 for head topics and w1', w2', w3', and w4 for modifier topics. The manner of combining these weights, i.e., whether to give greater weight to weight element w1 than to weight element w2, and so on, is a matter of preference. The second column represents the same combined weights after normalization according to the following rule: below a value of 90, weights are not changed; above a value of 90, they are compressed on a logarithmic scale to fit between 90 and 100.

As noted, the topic prioritizer 602 includes the topic normalizer 650 that determines the most appropriate morphosyntactic form for the topics. The topic normalizer 650 determines an optimal form for each topic among a number of possible variants and normalizes all such variants in the topic tree 603 to the selected optimal choice. The topic normalizer 650 will be described in detail below with reference to FIG. 12.

TABLE 2

| Before Normalization | After Normalization |
|---|---|
| 1154 | 100 |
| 1000 | 100 |
| 998 | 99 |
| 329 | 93 |
| 100 | 91 |
| 92 | 90 |
| 67 | 67 |
| 12 | 12 |

Figure 12:
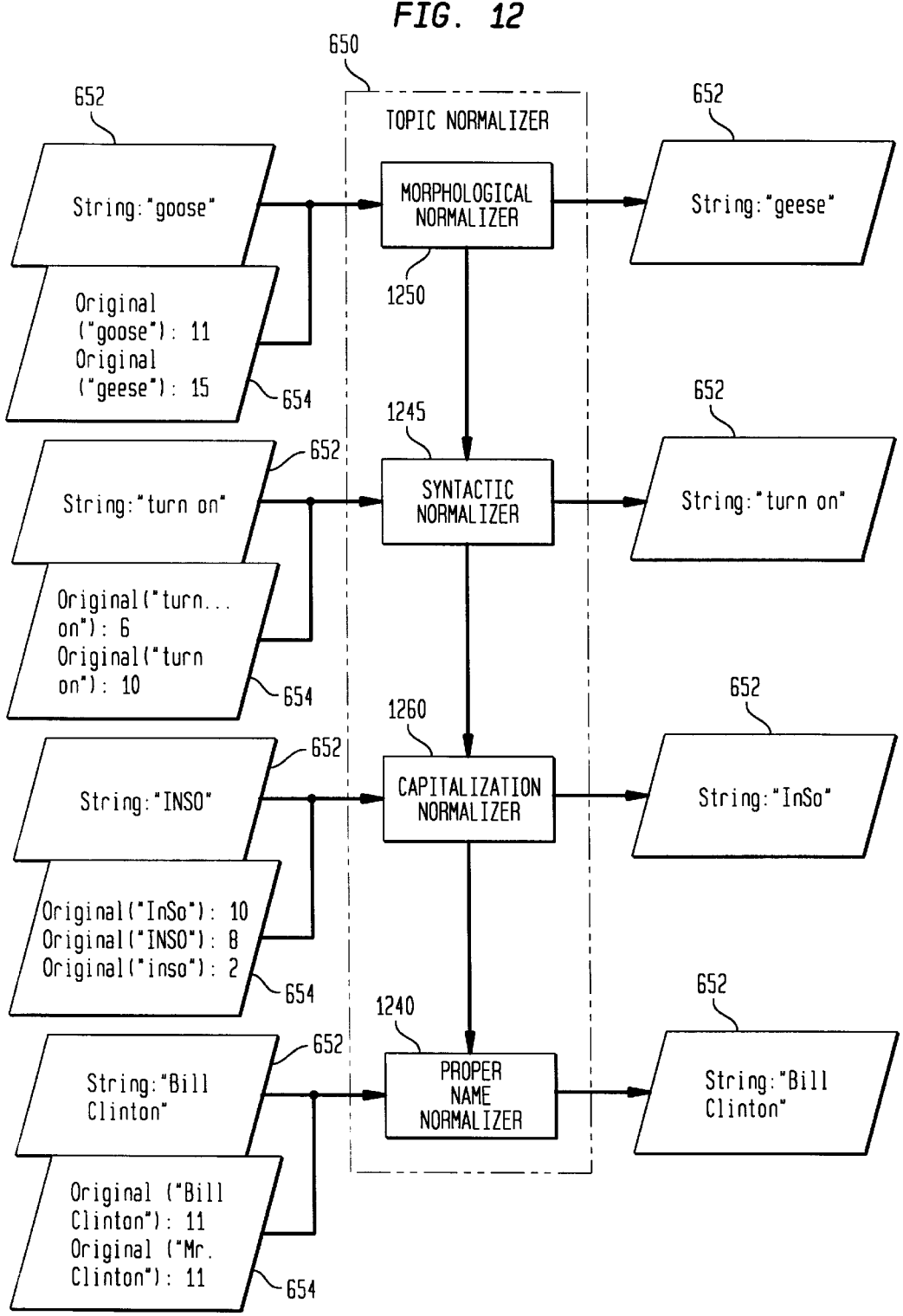
FIG. 12 is a functional block diagram of one embodiment of the topic normalizer shown in FIG. 6.

FIG. 12 is a functional block diagram of one embodiment of the topic normalizer 650. Variants in topic form may occur for a number of reasons, such as morphological usage and spelling errors, capitalization, use of and reference to proper names, and pronominal references. Morphosyntactic variations are language dependent. For example, in the English language, the predominant morphosyntactic variants for nouns are genitive and number. With respect to the use of the genitive case, the token "John's" may be considered a morphosyntactic variant of the noun phrase "of John". With respect to variants due to number, the word "geese" is a morphological variation of the word "goose." There are many other kinds of morphological variants in English, such as the word "Canadian," which is a derived form of the proper noun Canada. As described above in relation to token attribute generator 610, the morphological variants of each token in the sentence under consideration are transferred to temporary linguistic array 630. Thus, for example, if a sentence in a help file contains the token "geese," the morphosyntactic information in temporary linguistic array 630 for this token will typically include the root form, "goose." This root form typically will be used by topic record manager 1130 to create the topic, in this example, "goose." As noted above, while the "string" field of the topic record will thus contain the token "goose," topic record manager 1130 will also place the original form of the token, in this example, "geese," in the "original" field of the appropriate occurrence record. If the token "goose" appears in the help file, it will be inserted by topic record manager 1130 in both the "string" field of the topic record and in the "original" field of the occurrence record for that occurrence. Common misspellings may be treated in the same manner, with the presumed correct spelling constituting the "root" and the misspelled variant constituting the original form. Similarly, the original form "Dutch" will be placed in the "original" field of the occurrence record while the "root" form, as defined for initial capitalization in this embodiment, "dutch" will be placed by topic record creator 1130 in the "string" field of the topic record. More generally, the root form of all tokens typically will be placed in the "string" field while the original form of all tokens, which may also be the root form in any particular occurrence, will be preserved in the "original" field.

Morphological normalizer 1240 may advantageously be used to normalize the topic to the most common morphological form based on an examination of the "original" field in the occurrences records. Although any of a variety of techniques may be used to choose a preferred topic, the present embodiment chooses the form that occurs the most. For example, if the token "geese" had occurred 15 times in a help file, and the token "goose" had occurred 11 times, morphological normalizer 1240 would replace the token "goose" with the token "geese" in the "string" field of the appropriate topic record, thus changing the topic. If necessary, linkages would be changed to preserve the alphabetical order of topic records according to their topics using a known method for such alteration of linked data records.

Morphological normalizer 1240 may also be employed to normalize phrases, i.e., tokens created as described above for compound noun or verb phrases with respect to block 1105 of FIG. 11. Thus, the token "lay off" may be substituted by operation of block 1240 for the morphological variant "laid off" if there are more occurrences of the former than of the latter. The token "lay off" may similarly be substituted for the misspelled variant "lade off." Also, morphological differences due to regional variations, such as between the American "dialog" and the English "dialogue," may be normalized as represented by block 1240 by ensuring that the more frequently occurring variant occupies the "string" field of the appropriate topic record. It will be understood that the language dependency of the operation of morphological normalizer 1240 may be accommodated by employing a morphosyntactic dictionary 804 appropriate for the language of help project 114 or natural language query 160.

It will be understood that a variety of rules or procedures may be used to limit the situations in which morphological normalization is employed. For example, morphological normalizer 1240 typically restricts the operation of substituting a more frequently occurring variant for the root form only to instances involving topic heads. Modifier names are always represented in their original form. However the rule of head normalization may also have its own exception, typically for instances in which a head is part of a proper name or a verb participle. In another embodiment, the modifier can be normalized morphologically (i.e., "geese" will be substituted for "goose"), thus allowing the modifier to be linked to other occurrences of the same token used not as a modifier but as a rooted head. An example of the former is the token "States" in the strong compound noun phrase "United States." Even though the token "States" has a head dependency value, its root, "State," typically would not be substituted for it irrespective of the number of occurrences. Also, the verb participle "wedding" would not typically be changed to "wed." The decisions whether and when to apply such rules and their exceptions are matters of preference based on considerations known in the art.

Syntactic normalizer 1245 is used in the English language to normalize phrasal verb forms. For example, a help file may contain the phrasal verb "turn on" in two different forms: "turn the computer on" and "turn on the computer." Other subjects for syntactic normalization, i.e., where compound phrases may appear in different orders or with intervening words, are well known for all natural languages to those skilled in the art. Such subjects for syntactic normalization are operated upon by syntactic normalizer 1245 in the same manner as described above with respect to morphological normalizer 1240, as may be seen from the example shown in FIG. 12.

Variants resulting from differing usage of capitalization may also be normalized in the same manner, as represented by block 1250. For example, a company referred to as "INSO" in one occurrence of a help project may be referred to as "InSo" or "Inso" in other occurrences of the same help project. Another type of variation involves the presentation of proper names. For example, a help project may include all or some of the following variations for identifying the same person: "the President of the United States," "Mr. President," "President Clinton," "Bill Clinton," "Clinton," or other variations. As indicated in FIG. 12, proper name normalizer 1260 employs the same techniques as described above to normalize such variations. For example, morphological dictionary 804 may contain information identifying "Mr." as a title used with males in the English language. Similarly, morphological dictionary 804 may contain information identifying "Bill" as a proper noun used commonly for males. Thus, occurrences in a help file of both "Mr. Clinton" and "Bill Clinton" may be inserted by occurrence record manager 1140 in "original" fields of occurrence records linked to a topic record having a "string" field of "Clinton (male)," the "root" form, as inserted by topic record manager 1130. An occurrence of "Mrs. Clinton" would have the root form "Clinton (female)" and thus occupy a different topic record than that occupied by "Clinton (male)." Proper name normalizer chooses the most frequent occurrence of the various forms of "Clinton (male)" to occupy the "string" field of the appropriate topic record in the same manner as described above for the other normalization operations. For purposes of illustration the topic normalizer 650 is discussed here, although preferably, it is called before the topic pruner.

Topic normalizer 650 of the present embodiment does not normalize generic or pronominal references. For example, the generic reference "the company," or the pronominal reference, "it," may be used to refer to the INSO company. The pronominal references "he" or "him" might be used in a help project to refer to President Clinton. A group of companies, or people, might be referred to as "all of them." The morphosyntactic information stored in temporary linguistic array 630, in accordance with the operations described above, may typically be insufficient to resolve such references. Thus, in the present embodiment, such generic or pronominal references may be eliminated by syntactic filter 1010.

Referring again to FIG. 6, the key word builder 510 includes a keyword processor 604 that selects the most important topics based upon their assigned priority. The keyword processor normalizes the selected topics in relation to any topics manually provided by the software developer 110 and inserts these normalized topics into the database index 530. The keyword processor 604 includes a keyword selector 660 that selects the most important topics from the topic tree 603 which, as noted above, has been prioritized by the topic prioritizer 602. Because each topic has a weight, recorded in the "weight" field of its topic record as shown in FIG. 13, such operation may be effectuated by identifying any desired number of topics having the greatest weights. In the present embodiment, the number of such topics chosen is related to the number of topics in the topic tree so that, for example, the top ten percent of the topics as measured by their weights may be chosen. These most important topics will henceforth be referred to as "topic keywords." The keyword selector 660 generates topic keywords 662 which are provided to a keyword normalizer 670 of the keyword processor 604. The keyword normalizer 670 modifies the weights of topic keywords 662 and the weights of manual keywords 614, discussed below, so that such weights are based on a comparable scale. With respect to the operations performed on topic keywords 662, keyword normalizer 670 divides the weights calculated by weight normalizer 1560, as illustrated in Table 2 above, by ten and rounds to the nearest integer between 0 and 10, inclusive. Topic keywords 662 are then inserted by keyword normalizer 670 into database index 530A as shown in FIG. 6. FIG. 16 is a representation of database index 530 showing in lines 2–5 four entries corresponding to the topic keywords 662 resulting from the creation of topic tree 603 for the illustrative font.hlp file of FIG. 7. The topic keywords of FIG. 16 are arranged in descending order of their weights, although such ordering is not required. The numbers along the left margin of FIG. 16 are provided as line numbers for identification only and do not constitute part of database index 530. As seen in lines 2–5 of FIG. 16, the normalized weight of each topic keyword is followed by a colon, after which the topic is provided. End-of-line characters, such as a "hard return," that define the ending of each line, are not illustrated in FIG. 16. Following the last topic keyword entry, any arbitrary end-of-block symbol, such as the ";;" of line 6 of FIG. 16, is inserted by keyword normalizer 670 to indicate the end of the keywords.

As indicated in FIGS. 6 and 8, and described above in relation to format identifier 830, token attribute generator 610 identifies manual keywords 614, if any, and file name and title 612, if any. Keyword normalizer 670 assigns a weight, which typically may be "5" on the scale of 0 to 10 noted above, to the manual keywords 614. It will be understood that such assignment of a weight to manual keywords 614 may be accomplished in one of any of a variety of other known methods. If a manual keyword is the same as a topic keyword, the manual keyword will not be entered again, but the weight of the topic keyword will be increased by any of a variety of known methods so that the combined manual and topic keyword is closer to, but not greater than, 10. Keyword normalizer 670 then may rank the manual keywords 614 and topic keywords 662 by weight, although such ranking is not required, and then inserts them in database index 530A. FIG. 16 shows help project 114 consisting of information derived from help file 700 and other help files as herein described. "The numbers along" the left margin of FIG. 16 are provided for identification only and do not constitute part of database index 530. It will be understood that end-of-line designators, such as hard-line return characters, are present but not shown. The portion of database index 530 derived from help file 700 of help project 114 is designated in FIG. 16 as database index 530-1. The placement of file name, title, and keywords from another help file, not shown, of help project 114 is also symbolically represented by lines 20 through 22 and labeled database index 530-2A. The placement of such information from any additional help files of help project 114, not shown, are symbolically represented by database index 530-x in line 25 of FIG. 16.

Thus, keyword normalizer 670 inserts keywords for the example of help file 700 into database index 530-1A, as in FIG. 16, lines 2 through 5. As seen in lines 2–5 of FIG. 16, the normalized weight of each topic and manual keyword is followed by a colon, after which the topic is provided. Following the last keyword entry, any arbitrary end-of-block character, such as the ";;" of line 6 of FIG. 16, is inserted by keyword normalizer 670 to indicate the end of the keywords.

Having now described the building of database index 530A, constituting the keywords portion of the database index, the building of the linguistic-image portion of such index will now be described. Such linguistic-image portion is shown in lines 7 through 19 of FIG. 16 for the example of the help file 700 of FIG. 7, and may be referred to as database index 530-1B.

Figure 17:
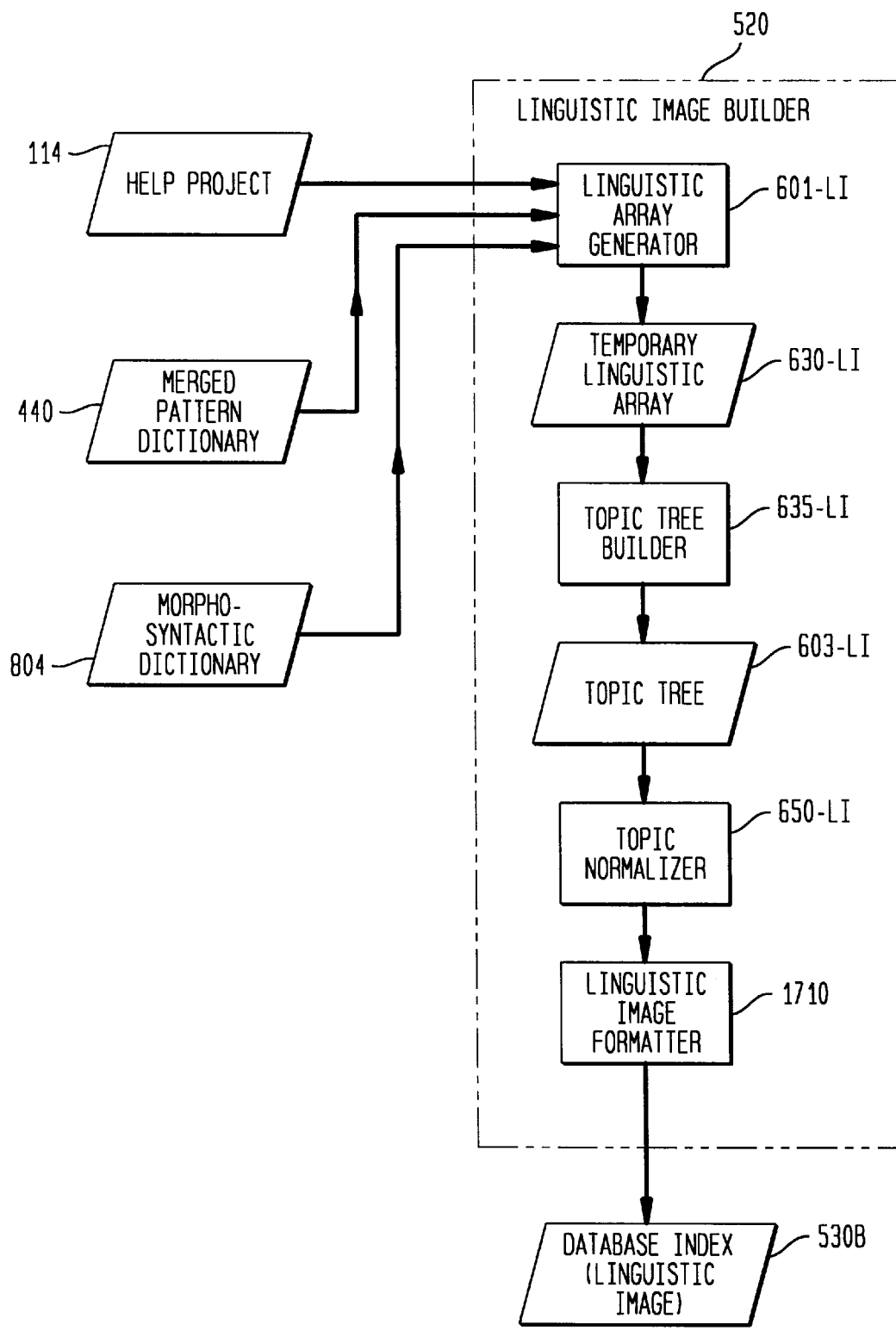
FIG. 17 is a functional block diagram of one embodiment of the linguistic image builder shown in FIG. 5.

The functions of linguistic image builder 520 of index builder 320 are represented in FIG. 17, and will henceforth be described in reference to the illustrative example of help file 700. The purpose of linguistic image builder 520 is to preserve all of the important morphosyntactic information in each sentence of help file 700 by placing such information in database index 530-1B. Thus, important topics identified as described below in natural language query 160, may not only be matched against the keywords generated by keyword builder 510, but also against the morphosyntactic information preserved for each sentence of help file 700 by linguistic image builder 520. The term "linguistic image" is intended to refer to such comprehensive preservation of important information, and exclusion of unimportant information, with respect to each sentence of the help file. The linguistic image of help file 700 is produced by building a separate topic tree for each sentence in the help file and placing the topics so generated into separate lines within database index 530-1B, as shown in FIG. 16.

The manner in which a topic tree is created for each sentence of help file 700 for this purpose is generally the same as the manner described above for creating a topic tree for help file 700 as a whole, with exceptions noted below. Therefore, the operation of all of the functional blocks representing linguistic image builder 520 have already been described above in reference to keyword builder 510, with the exception of linguistic image formatter 1710 and other specific exceptions noted below. To clarify the discussion, however, the functional blocks of linguistic image builder 520 are distinguished from the corresponding functions in keyword builder 510 by designating the former with "LI" for linguistic image. For example, the operations described above with respect to linguistic array generator 601 of keyword builder 510 are represented with respect to linguistic image builder 520 by linguistic array generator 601-LI.

The functions of linguistic image builder 520 are carried out separately for each sentence of the help file, such as help file 700, so that, as noted, a separate topic tree 603-LI is created for each such sentence. Specifically, linguistic array generator 601-LI operates separately on each sentence of help file 700 in the same manner as described above in relation to linguistic array generator 601 of keyword builder 510, with one exception. The exception is that file name and title 612 and manual keywords 614 are not stored for use by keyword normalizer 670.

For each such sentence, topic tree builder 635-LI of FIG. 17 builds a topic tree in the same manner as described above in relation to topic tree builder 635 of keyword builder 510. However, whereas the topic tree 603 generated in keyword builder 510 is processed by topic prioritizer 602 by weighing and normalizing, the topic tree 603-LI generated in linguistic image builder 520 for a single sentence is processed only by normalizing. normalizing and the topics are not inserted alphabetically but sequentially Specifically, the function of topic weight calculator 640 of keyword builder 510 is not undertaken by linguistic image builder 520 because all important topics, irrespective of any weight that might be assigned to them, are preserved in the linguistic image of help file 700. Thus, there is no need to weigh and prune topics as is undertaken in topic weight calculator 640 of keyword builder 510, nor to select keywords according to their weights as is done by keyword normalizer 670 of keyword builder 510. Rather, as shown in FIG. 17, the topic tree 603-LI generated by topic tree generator 635-LI of linguistic image builder 520 is processed only by topic normalizer 650-LI. The operations of this topic normalizer are the same as those of topic normalizer 650 of keyword builder 510.

Linguistic image formatter 1710 identifies each head topic of topic tree 603-LI by placing the symbol "#" after each such topic, as shown for example in line 8 of FIG. 16 for the entry "bold#." Linguistic image formatter 1710 identifies each synonym topic by placing the symbols "#$" after each such topic, as shown for example in line 12 for the entry "stop#$, which is a synonym for the topic "turn-off." A synonym topic is one linked by a pointer in the "synonym" field of a topic record, such as the synonym topic "demotic" shown in synonym record 1374 as linked to topic record 1370 of FIG. 13. As shown in FIG. 16, each topic of the topic tree for the sentence under consideration is placed by linguistic image formatter 1710 in a line of the database index 530B. An end-of-line character, not shown, is added at the end of the line when all of the topics of the sentence under consideration have been so placed. It will be understood that any of a variety of other known methods of identifying such topics may be employed in other embodiments. The operations described above are then repeated for another sentence of help file 700 until all such sentences have been so operated upon. Any end-of-record indicator, such as the arbitrary characters ";;;" shown in line 19 of FIG. 16, is then inserted by linguistic image formatter 1710 to indicate that the database index 530B for help file 700 has been completed.

The operations described above with respect to keyword builder 510 and linguistic image builder 520 are repeated for each of the files in help project 114. When such operations are completed, database index 530 is completed and may be converted by ASCII to binary convertor 540, using any one of a variety of known techniques, into binary database index 130, as represented in FIG. 5.

Having described the operations of non-real time development system 102, the operations of real-time retrieval system 104 may now be described. As represented in FIG. 4, and noted above, real-time retrieval system 104 morphosyntactically analyzes a natural language query 160 from user 150, compares the results of such analysis with the results of substantially the same type of morphosyntactic analysis of help project 114 by non-real time development system 102, and provides user 150 with access to the portions of help project 114 most closely related to the natural language query. The analysis and comparison functions are carried out by query builder 410 and query-index matcher 420 of natural language interface 170, respectively. Having identified the most closely related information, real-time retrieval system 104 provides the user with access by means of known help browser 180.

Figure 18:
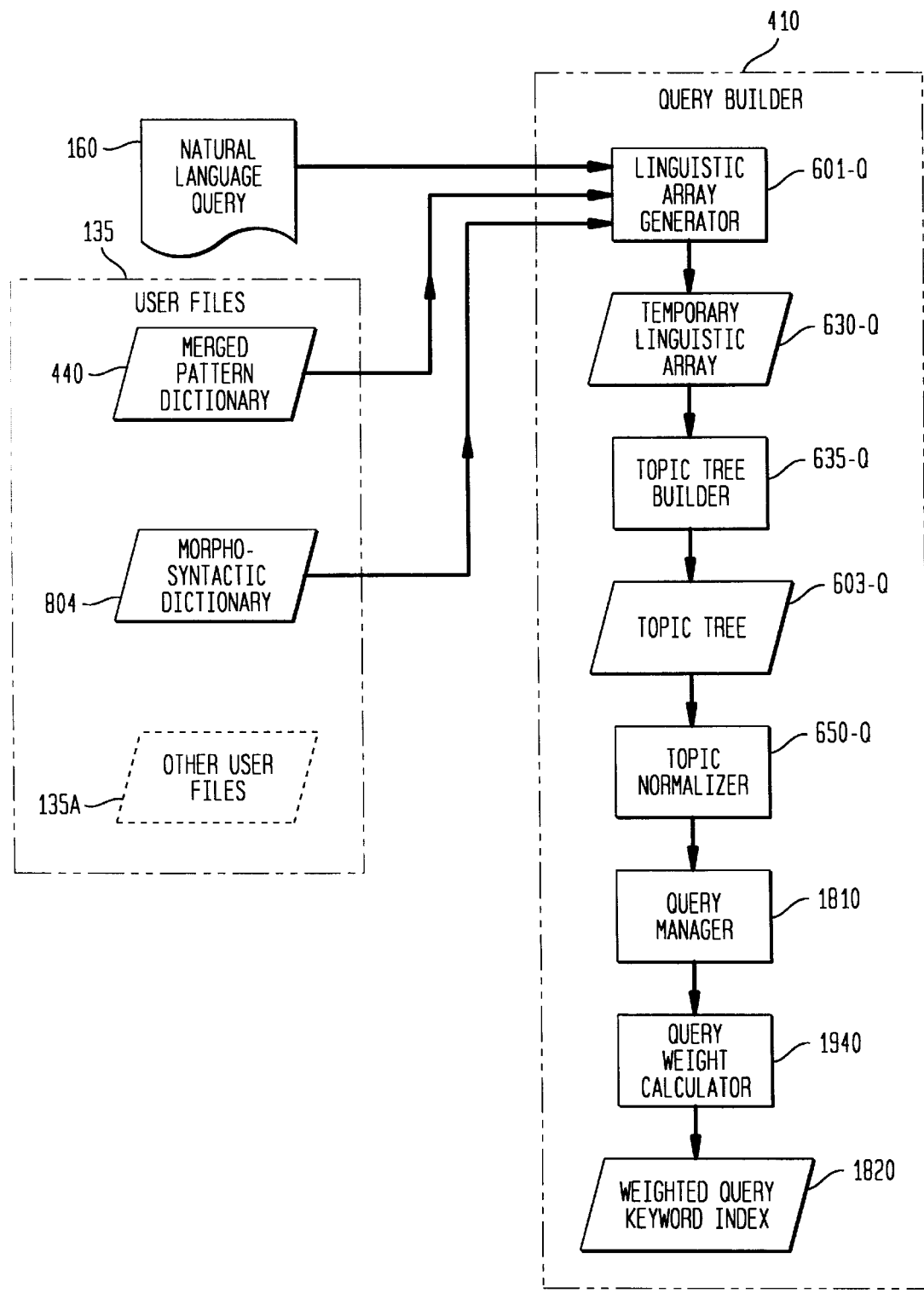
FIG. 18 is a functional block diagram of one embodiment of the query builder shown in FIG. 4.

FIG. 18 is a functional block diagram of query builder 410. Its purpose is to identify the important information in the natural language query. To achieve this purpose, query builder 410 generates a topic tree generally using the techniques described above with respect to linguistic image builder 520. Therefore, the operation of all of the functional blocks representing query builder 410 have already been described above in reference to linguistic image builder 520, with the exception of query manager 1810 and other specific exceptions noted below. To clarify the discussion, the functional blocks of query builder 410 are distinguished from the corresponding functions in linguistic image builder 520 and keyword builder 510 by designating the former with "Q" for query builder. For example, the operations described above with respect to linguistic array generator 601-LI of linguistic image builder 520 and linguistic array generator 601 of keyword builder 510 are represented with respect to query builder 520 by 601-Q.

Linguistic array generator 601-Q operates on natural language query 160 in the same manner as linguistic array generator 601-LI operates on a sentence of a help file. In the present embodiment, it is assumed that natural language query 160 consists of a single sentence. In another embodiment, this need not be so as additional sentences in the same or additional queries could be processed in the same manner as described herein, as will be evident to those skilled in the art.

For each such sentence, topic tree builder 635-Q builds a topic tree in the same manner as described above in relation to topic tree builder 635-LI of linguistic image builder 520. As shown in FIG. 18, the topic tree 603-Q generated by topic tree generator 635-Q of query builder 410 is processed by topic normalizer 650-Q. The operations of this topic normalizer are the same as those of topic normalizer 650-LI of linguistic image builder 520 and topic normalizer 650 of keyword builder 510.

Figure 19A:
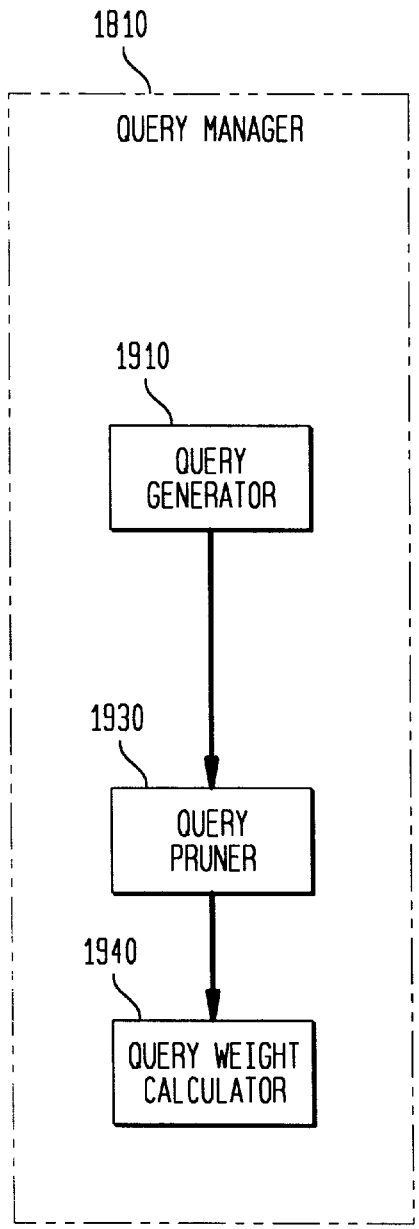
FIG. 19A is a functional block diagram of one embodiment of the query manager shown in FIG. 18.

The normalized topics are operated upon by query manager 1810, which is represented by the functional block diagram of FIG. 19A. Query generator 1910 of query manager 1810 uses all of the normalized topics and creates all possible combinations of them, and also inserts boolean, order and proximity operators in each combination. The purpose of such operators is to preserve certain syntactic information such as whether a topic in a combination appeared just before another topic with which it appears in a combination, and so on. For example, operators such as after, before, near, with, and so on, may be represented by the symbols "→," "←," "&," and <&>, or any other arbitrarily chosen symbols. Similar operators will be known to those skilled in the art. Because the number of such combinations may be large for large queries, and in order to eliminate combinations that are not likely to convey important information, these combinations are typically reduced by query pruner 1930.

Figure 19B:
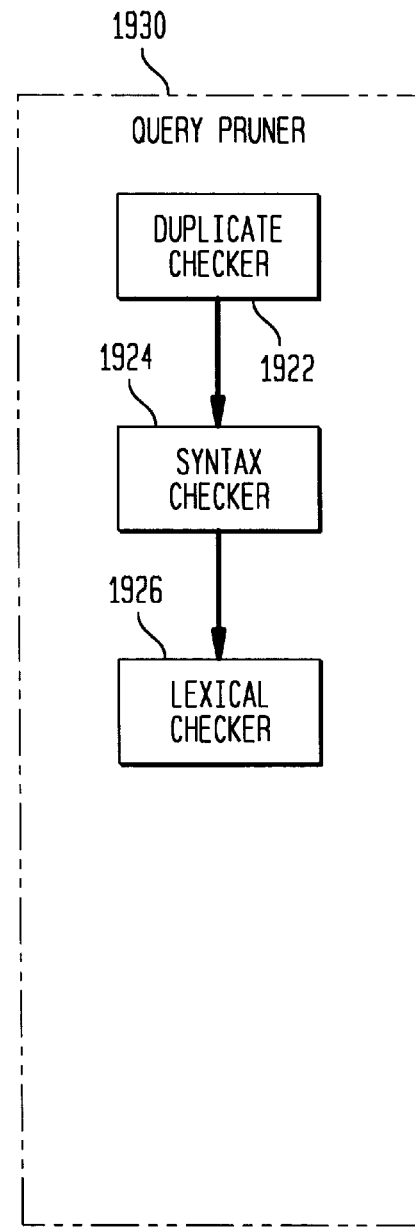
FIG. 19B is a functional block diagram of one embodiment of the query pruner shown in FIG. 19A.

As indicated in FIG. 19B, query pruner 1930 consists of five checking functions that prune combinations that appear to be unimportant based on lexical and syntactic analysis. Duplicate checker 1922 eliminates combinations in which the same topic appears more than once. For example, in the question: "How can I within a document edit another document," one possible combination, which will be eliminated by duplicate checker 1922, will be "document & edit→document." Syntax checker 1924 eliminates, for example, combinations in which adverbs appear without their governing verbs, or transitive verbs of wide meaning without their corresponding objects ("take advantage"). In the case of noun phrases this checker also eliminates combinations in which a modifier appears without its topic head, unless the topic has been marked as a weak head, that is, too vague and where the modifier is considered to be the content bearing term. This checker also takes care that parts of compounds are not appearing on their own in any of the combinations. The Lexical checker 1926 prevents, for example, that a query consists of just one very general topic, unless there is no other query combination available. It is also prevents that frequent or vague topics appear without their modifiers. Other techniques for eliminating combinations that are not likely to convey important information, as known to those skilled in the art, may also be employed.

Query weight calculator 1940 assigns weights to the combinations remaining after the pruning operation of query pruner 1930 has been completed. In another embodiment, such weighing could occur before pruning in a manner that will be readily understood by those skilled in the art. Query calculator assigns a weight to the query terms based on syntactic clues (such as: head, modifier, noun, proper noun, unknown word, verb, object), and lexical information (weak verb or noun, important adjective, etc). The query combination will receive a basic weight which is equal to the addition of the weights of the individual query terms and which can be modified according to the likelihood of the combination being a good one or a more questionable one. Other techniques for weighing are possible, as will be known to those skilled in the art.

The output of Query weight calculator 1940 may be referred to as a weighted query keyword index, as represented by block 1820 of FIG. 18. An illustrative example of the content of block 1820 may be described in reference to the following example of a natural language query 160: "How can I make my usual font bold?" A typical weighted query keyword index 1820 for this question is shown in Table 3.

TABLE 3

| Weight | Keyword Index Combination |
| --- | --- |
| 10 | make AND standard NEXT_TO font AND bold |
| 9 | make AND font AND bold |
| 7 | standard NEXT_TO font AND bold |
| 7 | font AND bold |
| 5 | make AND bold |
| 3 | bold |

Weighted query keyword index 1820 constitutes the output of query builder 410 and control therefore passes from query builder 410 to query-index matcher 420, as shown in FIG. 4. The purposes of query-index matcher 420 are to match weighted query keyword index 1820 with binary database index 130; and then select in accordance with such matching the portion of help project 114, as contained in user files 135, that is most closely related to the natural language query 160 as represented by weighted query keyword index 1820. A variety of techniques may be used to accomplish the foregoing purposes, as will be evident to those skilled in the art.

Advantageously, query-index matcher 420 attempts to match the first combination in index 1820. It is not material in what order the combinations are considered, as long as they are all considered sequentially as will now be described. If all of the query topics in such first combination are not found in the binary database index 130, representing all help files in help project 114, then repeat this procedure, referred to as procedure 1, with respect to another combination in index 1820. If a combination in index 1820 succeeds in matching all of its query topics with the same topics in index 130, then nevertheless continue with procedure 1 if all the query topics are not matched within the same help file. Record in memory 256, however, the number of help files required to make all of the matches, such number referred to as the match file number. When procedure 1 has been completed for all combinations in index 1820, assign a weight to each of the matches. A variety of techniques and criteria may be used to achieve this purpose. These include: increase the weight for each of the following conditions that have been met: all query topics are matched in a title in database index 530-1A, all query topics are matched in a single database index 530-1B. Increase the weight if the query topics are not just found, but also matched using the order and proximity operators that the query generator 1910 has inserted into the query topics. Also increase the weight of the match using the weight of the matched query itself.

As noted above, the most highly weighted matches are provided by query-index matcher 420 to help browser 180. Also so provided are the locations of the portions of help project 114 in user files 135 to which the matched entries in the binary database index refer. Such location information, as noted above, is contained in the occurrence data structure 654 in its form as converted to binary format by ASCII to binary converter 540.

While various embodiments of the present invention have been described above, it should be understood that they have been presented by way of example only, and not limitation. For example, the present invention may be used with any type of natural language databases, including, for example, collections of E-mails or other textual files, located locally or remotely on one or more computer platforms. Also, the above implementation has been in a natural language database and query. However, as one skilled in the relevant art would find apparent, the teachings of the present invention may be applied to databases and queries expressed in a language other than a natural language which has ascertainable rules of grammar, syntax, etc. Thus, the breadth and scope of the present invention are not limited by any of the above-described exemplary embodiments, but are defined only in accordance with the following claims and their equivalents.

What is claimed is:

1. An information retrieval system using natural language queries to retrieve information from a language-based database containing one or more files, comprising:

a non-real-time development system for automatically creating a database index having one or more content-based database keywords of the database; and a real-time retrieval system that, in response to a user's natural language queries, searches said database index for one or more content-based query keywords derived from a natural language query, wherein said development system and said retrieval system morphologically, syntactically and linguistically analyze said language-based database and said natural language query, respectively, to generate said one or more database keywords and query keywords representing the content of said language-based database and said natural language query, respectively.

2. The information retrieval system of claim 1, wherein said development system comprises:

a software development system for creating said database index utilizing a pattern dictionary that includes synonyms and skip words and a morphosyntactic dictionary that includes morphological and syntactic information for words in the natural language of the language-based database and natural language query.

3. The information retrieval system of claim 2, wherein said retrieval system comprises:

a natural language interface system for creating said one or more query keywords utilizing said pattern dictionary and said morphosyntactic dictionary; and a query-index matcher for matching said one or more query keywords with said one or more database keywords.

4. The information retrieval system of claim 3, wherein said software development system is configured as a software developer's kit (SDK).

5. The information retrieval system of claim 3, wherein said pattern dictionary and said morphosyntactic dictionary are customized to more accurately reflect linguistic features of said language-based database and said natural language query.

6. The information retrieval system of claim 3, wherein said software development system comprises:

an index builder that generates said database index; and an expression list editor that enables a software developer to modify said pattern dictionary to generate a merged pattern dictionary.

7. The information retrieval system of claim 6, wherein said index builder comprises:

a keyword builder for identifying topics most useful in identifying the contents of each of the one or more data base files; and a linguistic image builder for identifying and representing linguistic relationships most useful in identifying the contents of each sentence of each of the one or more data base files.

8. The information retrieval system of claim 7, wherein said keyword builder comprises:

a linguistic array generator for sequentially processing each sentence unit in each database file to generate a temporary linguistic array that contains tokens associated with selected words and contains relevant morphosyntactic and linguistic attributes of said associated word; and a topic tree builder that builds a topic tree of linked data structures, including, topic records for each of said tokens, each said topic record containing roots of said words associated with said tokens and token attributes identifying morphological, syntactical and semantic characteristics of and relations between said associated words, occurrence records containing location of said associated words and original form of each of said associated words, and synonym records containing synonyms of said associated words.

9. The information retrieval system of claim 8, wherein said keyword builder further comprises:

a topic prioritizer that prioritizes the normalized topics in said topic tree in accordance with the frequency of their occurrence and other indicators of their importance inferred from said token attributes; and a keyword processor for selecting topic records based on their assigned priority, and for normalizing said topics contained in said selected topic records, said topics inserted into said keyword list as said content-based data base keywords.

10. The information retrieval system of claim 9, wherein said linguistic array generator comprises:

a token attribute generator for identifying and morphologically and syntactically characterizing said tokens and said sentence units in the said database files and for populating said a linguistic array with identified attributes;

a syntactic tagger for supplementing said linguistic array with morphological, syntactic and linguistic data identifying a relative importance of each token in said array; and a parse filter for filtering tokens from said array that are likely not to assist in matching said query keywords with said database keywords.

11. The information retrieval system of claim 10, wherein said token attribute generator comprises:

a token identifier for identifying tokens in said data base help files;

a sentence unit identifier for demarcating sentences in said data base files;

a format identifier for identifying a category of text in which said token appears.

12. The information retrieval system of claim 11, wherein said token attribute generator further comprises:

a position identifier for identifying the position of the token in said data base files;

a layout identifier for identifying a location of said sentence unit in said data base files;

a morphosyntactic identifier for populating said array with all morphosyntactic information from said morphosyntactic dictionary for each said token; and a special token identifier for identifying said tokens related to particular categories of information.

13. The information retrieval system of claim 11, wherein said syntactic tagger comprises:

a morphological identifier for identifying a preferred morphological form of each word associated with each of said tokens; and a syntactic unit identifier for identifying groups of tokens in syntactic units and identifying dependencies among said tokens within each syntactic unit.

14. The information retrieval system of claim 13, wherein said syntactic tagger further comprises:

a grammatical identifier that identifies the grammatical function of the tokens; and a synonym identifier that identifies a label representing a group of synonyms in the merged pattern dictionary.

15. The information retrieval system of claim 14, wherein said parse filter comprises:

a syntactic filter for syntactically filtering tokens from said array that are likely not to assist in matching query keywords and database keywords; and a lexical filter that eliminates tokens associated with predetermined words that are likely not to assist in matching topics of a natural language query to topics of a database text file.

16. The information retrieval system of claim 11, wherein said topic prioritizer comprises:

a token weight calculator for prioritizing the topics in the topic tree in accordance with the frequency of their occurrence and other indicators of their importance inferred from their token attributes; and a token normalizer that determines the most appropriate morphosyntactic form for the topic based upon the form that occurred most frequently for that topic.

* * * * *